US012173989B2

(12) United States Patent
Pirc et al.

(10) Patent No.: US 12,173,989 B2
(45) Date of Patent: Dec. 24, 2024

(54) MOTION-BASED OPERATION FOR A CONDUCTED ELECTRICAL WEAPON

(71) Applicant: Axon Enterprise, Inc., Scottsdale, AZ (US)

(72) Inventors: William Pirc, Scottsdale, AZ (US); David Ryan Bartling, Paradise Valley, AZ (US)

( * ) Notice: Subject to any disclaimer, the term of this patent is extended or adjusted under 35 U.S.C. 154(b) by 0 days.

(21) Appl. No.: 17/209,661

(22) Filed: Mar. 23, 2021

(65) Prior Publication Data

US 2021/0364256 A1 Nov. 25, 2021

Related U.S. Application Data

(60) Provisional application No. 63/041,725, filed on Jun. 19, 2020, provisional application No. 63/013,537, filed on Apr. 21, 2020.

(51) Int. Cl.
*F41H 13/00* (2006.01)
*H05C 1/00* (2006.01)

(52) U.S. Cl.
CPC .......... *F41H 13/0025* (2013.01); *H05C 1/00* (2013.01)

(58) Field of Classification Search
CPC .............................. F41H 13/0025; H05C 1/00
USPC .......................................................... 361/232
See application file for complete search history.

(56) References Cited

U.S. PATENT DOCUMENTS 8,020,481 B1 9/2011 Beckwith
9,057,585 B1 6/2015 Veldman et al.
9,816,789 B1 11/2017 Hyde et al.
2006/0005447 A1* 1/2006 Lenner ...................... F41G 3/06 42/111
2007/0070574 A1* 3/2007 Nerheim ............. F41H 13/0025 361/232
2011/0046920 A1 2/2011 Amis
2012/0037702 A1* 2/2012 Kude ........................ F41G 1/38 235/407
2012/0297658 A1* 11/2012 Lupher ................ G02B 23/145 42/122
2019/0003804 A1 1/2019 Deng et al.
2019/0323545 A1 10/2019 Prestwich et al.

(Continued)

FOREIGN PATENT DOCUMENTS

EP 1762812 A1 3/2007
EP 2733581 A2 5/2014
WO 2015-103155 A1 7/2015

OTHER PUBLICATIONS

Korean Intellectual Property Office, International Search Report for International Patent Application No. PCT/US2021/028390 mailed Aug. 6, 2021.

(Continued)

*Primary Examiner* — Thienvu V Tran
*Assistant Examiner* — Sreeya Sreevatsa
(74) *Attorney, Agent, or Firm* — Justin Powley

(57) ABSTRACT

A conducted electrical weapon ("CEW") launches electrodes to provide a stimulus signal through a target to impede locomotion of the target. The CEW may include a motion detector that detects movement of the CEW or the handle of the CEW. In response to the CEW detecting a predetermined movement in accordance with the movement detected by the motion detector, the CEW may perform one or more operations.

20 Claims, 7 Drawing Sheets

(56) References Cited

U.S. PATENT DOCUMENTS

2020/0109926 A1* 4/2020 Mata ........................ G01P 15/18
2022/0221240 A1* 7/2022 Song ..................... F41A 17/063

OTHER PUBLICATIONS

IP Australia, First Examination Report for Australian Application No. 2021261330 mailed Dec. 1, 2023.
European Patent Office, Extended European Search Report for European Application No. 21791917.4 mailed Jun. 25, 2024.
European Patent Office, Communication pursuant to Rule 164(1) EPC for European Application No. 21791917.4 mailed Mar. 20, 2024.

* cited by examiner

MOTION-BASED OPERATION FOR A CONDUCTED ELECTRICAL WEAPON

CROSS-REFERENCE TO RELATED APPLICATIONS

This application claims priority to, and the benefit of, U.S. Provisional Patent Application No. 63/013,537, filed Apr. 21, 2020, and entitled "MOTION-BASED SELECTION OF A CARTRIDGE FOR A CONDUCTED ELECTRICAL WEAPON," and U.S. Provisional Patent Application No. 63/041,725, filed Jun. 19, 2020, and entitled "MOTION-BASED SELECTION OF A CARTRIDGE FOR A CONDUCTED ELECTRICAL WEAPON," both of which are hereby incorporated by reference in their entirety.

FIELD OF THE INVENTION

Embodiments of the present invention relate to a conducted electrical weapon ("CEW") configured to perform one or more operations in response to detecting a motion-based operation of the CEW.

BRIEF DESCRIPTION OF THE DRAWING

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Figure 1:
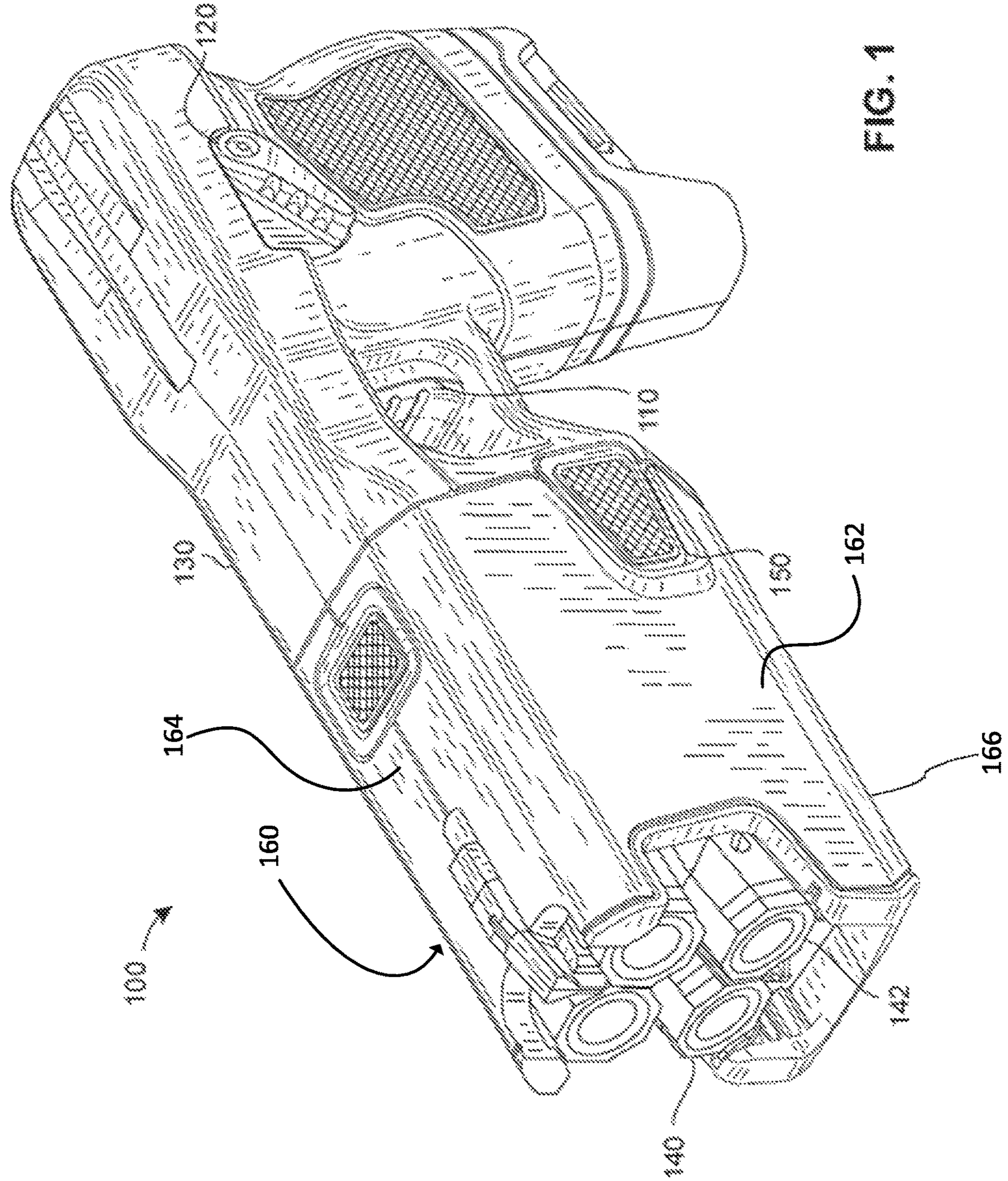
FIG. 1 is a perspective view of a CEW, in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected, or the like may include permanent, removable, temporary, partial, full, and/or any other possible attachment option. Additionally, any reference to without contact (or similar phrases) may also include reduced contact or minimal contact. Surface shading lines may be used throughout the figures to denote different parts but not necessarily to denote the same or different materials.

Systems, methods, and apparatuses may be used to interfere with voluntary locomotion (e.g., walking, running, moving, etc.) of a target. For example, a CEW may be used to deliver a current (e.g., stimulus signal, pulses of current, pulses of charge, etc.) through tissue of a human or animal target. Although typically referred to as a conducted electrical weapon, as described herein a "CEW" may refer to a conducted electrical weapon, a conducted energy weapon, and/or any other similar device or apparatus configured to provide a stimulus signal through one or more deployed projectiles (e.g., electrodes).

A stimulus signal carries a charge into target tissue. The stimulus signal may interfere with voluntary locomotion of the target. The stimulus signal may cause pain. The pain may also function to encourage the target to stop moving. The stimulus signal may cause skeletal muscles of the target to become stiff (e.g., lock up, freeze, etc.). The stiffening of the muscles in response to a stimulus signal may be referred to as neuromuscular incapacitation ("NMI"). NMI disrupts voluntary control of the muscles of the target. The inability of the target to control its muscles interferes with locomotion of the target.

A stimulus signal may be delivered through the target via terminals coupled to the CEW. Delivery via terminals may be referred to as a local delivery (e.g., a local stun, a drive stun, etc.). During local delivery, the terminals are brought close to the target by positioning the CEW proximate to the target. The stimulus signal is delivered through the target's tissue via the terminals. To provide local delivery, the user of the CEW is generally within arm's reach of the target and brings the terminals of the CEW into contact with or proximate to the target.

A stimulus signal may be delivered through the target via one or more (typically at least two) wire-tethered electrodes. Delivery via wire-tethered electrodes may be referred to as a remote delivery (e.g., a remote stun). During a remote delivery, the CEW may be separated from the target up to the length (e.g., 15 feet, 20 feet, 30 feet, etc.) of the wire tether. The CEW launches the electrodes towards the target. As the electrodes travel toward the target, the respective wire tethers deploy behind the electrodes. The wire tether electrically couples the CEW to the electrode. The electrode may electrically couple to the target thereby coupling the CEW to the target. In response to the electrodes connecting with, impacting on, or being positioned proximate to the target's tissue, the current may be provided through the target via the electrodes (e.g., a circuit is formed through the first tether and the first electrode, the target's tissue, and the second electrode and the second tether).

Terminals or electrodes that contact or are proximate to the target's tissue deliver the stimulus signal through the target. Contact of a terminal or electrode with the target's tissue establishes an electrical coupling (e.g., circuit) with the target's tissue. Electrodes may include a spear that may pierce the target's tissue to contact the target. A terminal or electrode that is proximate to the target's tissue may use ionization to establish an electrical coupling with the target's tissue. Ionization may also be referred to as arcing.

In use (e.g., during deployment), a terminal or electrode may be separated from the target's tissue by the target's clothing or a gap of air. In various embodiments, a signal generator of the CEW may provide the stimulus signal (e.g., current, pulses of current, etc.) at a high voltage (e.g., in the range of 40,000 to 100,000 volts) to ionize the air in the clothing or the air in the gap that separates the terminal or electrode from the target's tissue. Ionizing the air establishes a low impedance ionization path from the terminal or electrode to the target's tissue that may be used to deliver the stimulus signal into the target's tissue via the ionization path. The ionization path persists (e.g., remains in existence, lasts, etc.) as long as the current of a pulse of the stimulus signal is provided via the ionization path. When the current ceases or is reduced below a threshold (e.g., amperage, voltage), the ionization path collapses (e.g., ceases to exist) and the terminal or electrode is no longer electrically coupled to the target's tissue. Lacking the ionization path, the impedance between the terminal or electrode and target tissue is high. A high voltage in the range of about 50,000 volts can ionize air in a gap of up to about one inch.

A CEW may provide a stimulus signal as a series of current pulses. Each current pulse may include a high voltage portion (e.g., 40,000-100,000 volts) and a low voltage portion (e.g., 500-6,000 volts). The high voltage portion of a pulse of a stimulus signal may ionize air in a gap between an electrode or terminal and a target to electrically couple the electrode or terminal to the target. In response to the electrode or terminal being electrically coupled to the target, the low voltage portion of the pulse delivers an amount of charge into the target's tissue via the ionization path. In response to the electrode or terminal being electrically coupled to the target by contact (e.g., touching, spear embedded into tissue, etc.), the high portion of the pulse and the low portion of the pulse both deliver charge to the target's tissue. Generally, the low voltage portion of the pulse delivers a majority of the charge of the pulse into the target's tissue. In various embodiments, the high voltage portion of a pulse of the stimulus signal may be referred to as the spark or ionization portion. The low voltage portion of a pulse may be referred to as the muscle portion.

In various embodiments, a signal generator of the CEW may provide the stimulus signal (e.g., current, pulses of current, etc.) at only a low voltage (e.g., less than 2,000 volts). The low voltage stimulus signal may not ionize the air in the clothing or the air in the gap that separates the terminal or electrode from the target's tissue. A CEW having a signal generator providing stimulus signals at only a low voltage (e.g., a low voltage signal generator) may require deployed electrodes to be electrically coupled to the target by contact (e.g., touching, spear embedded into tissue, etc.).

A CEW may include at least two terminals at the face of the CEW. A CEW may include two terminals for each bay that accepts a deployment unit (e.g., cartridge). The terminals are spaced apart from each other. In response to the electrodes of the deployment unit in the bay having not been deployed, the high voltage impressed across the terminals will result in ionization of the air between the terminals. The arc between the terminals may be visible to the naked eye. In response to a launched electrode not electrically coupling to a target, the current that would have been provided via the electrodes may arc across the face of the CEW via the terminals.

The likelihood that the stimulus signal will cause NMI increases when the electrodes that deliver the stimulus signal are spaced apart at least 6 inches (15.24 centimeters) so that the current from the stimulus signal flows through the at least 6 inches of the target's tissue. In various embodiments, the electrodes preferably should be spaced apart at least 12 inches (30.48 centimeters) on the target. Because the terminals on a CEW are typically less than 6 inches apart, a stimulus signal delivered through the target's tissue via terminals likely will not cause NMI, only pain.

A series of pulses may include two or more pulses separated in time. Each pulse delivers an amount of charge into the target's tissue. In response to the electrodes being appropriately spaced (as discussed above), the likelihood of inducing NMI increases as each pulse delivers an amount of charge in the range of 55 microcoulombs to 71 microcoulombs per pulse. The likelihood of inducing NMI increases when the rate of pulse delivery (e.g., rate, pulse rate, repetition rate, etc.) is between 11 pulses per second ("pps") and 50 pps. Pulses delivered at a higher rate may provide less charge per pulse to induce NMI. Pulses that deliver more charge per pulse may be delivered at a lesser rate to induce NMI. In various embodiments, a CEW may be hand-held and use batteries to provide the pulses of the stimulus signal. In response to the amount of charge per pulse being high and the pulse rate being high, the CEW may use more energy than is needed to induce NMI. Using more energy than is needed depletes batteries more quickly.

Empirical testing has shown that the power of the battery (e.g., power supply) may be conserved with a high likelihood of causing NMI in response to the pulse rate being less than 44 pps and the charge per a pulse being about 63 microcoulombs. Empirical testing has shown that a pulse rate of 22 pps and 63 microcoulombs per a pulse via a pair of electrodes will induce NMI when the electrode spacing is at least 12 inches (30.48 centimeters).

In various embodiments, a CEW may include a handle and one or more deployment units (e.g., cartridges, magazines, etc.). The handle may include one or more bays for receiving the deployment units. Each deployment unit may be removably positioned in (e.g., inserted into, coupled to, etc.) a bay. Each deployment unit may releasably electrically, electronically, and/or mechanically couple to a bay.

In various embodiments, a deployment unit may include two or more electrodes that are launched at the same time. In various embodiments, a deployment unit may include two or more electrodes that may be launched individually at separate times. A deployment of the CEW may launch one or more electrodes toward a target to remotely deliver the stimulus signal through the target. Launching the electrodes may be referred to as activating (e.g., firing) a deployment unit. After use (e.g., activation, firing), a deployment unit may be removed from the bay and replaced with an unused (e.g., not fired, not activated) deployment unit to permit launch of additional electrodes. The movement caused by launching the electrodes may be detected by the CEW.

Generally, a CEW is carried by an officer (e.g., law enforcement officer, police officer, security personnel, person, etc.). During periods while the CEW is not being used, the CEW may be positioned in a holster that is suspended from the belt or hip of the officer. As the officer moves, the holster also moves thereby moving the CEW with the holster. The CEW may detect movement of the CEW as it moves with the holster.

During periods when the CEW is removed from the holster (e.g., used to interfere with locomotion of a target), the CEW is generally held manually by (e.g., in the hands of) the officer so that the CEW may be oriented (e.g., pointed, aimed, etc.) toward the target. The CEW may be physically manipulated (e.g., manually pointed, aimed, etc.) by the officer to aim the CEW. A user interface of the CEW (e.g., trigger, reactivation, etc.) may be manually operated to deploy one or more electrodes from the CEW, provide the stimulus signal to the target, and/or provide additional stimulus signal through deployed electrodes. The CEW may detect movement of the CEW by the officer in response to the officer withdrawing the CEW from the holster, aiming the CEW, operating the user interface of the CEW, returning the CEW to the holster, and/or similar such movements.

In various embodiments, a CEW handle may comprise a housing. The housing may be configured to house various components of the CEW that are configured to enable deployment of the deployment units, provide an electrical current to the deployment units, and otherwise aid in the operation of the CEW, as discussed further herein. The housing may comprise any suitable shape and/or size. The housing may comprise a handle end opposite a deployment end. The deployment end may be configured, and sized and shaped, to receive one or more deployment units. The handle end may be sized and shaped to be held in a hand of a user. For example, the handle end may be shaped as a handle to enable hand-operation of the CEW by the user. In various embodiments, the handle end may also comprise contours shaped to fit the hand of a user, for example, an ergonomic grip. The handle end may include a surface coating, such as, for example, a non-slip surface, a grip pad, a rubber texture, and/or the like. As a further example, the handle end may be wrapped in leather, a colored print, and/or any other suitable material, as desired.

In various embodiments, the housing may comprise various mechanical, electronic, and/or electrical components configured to aid in performing the functions of the CEW. For example, the housing may comprise one or more triggers, control interfaces, processing circuits, power supplies, and/or signal generators. The housing may include a guard defining an opening formed in the housing. The guard may be located on a center region of the housing (e.g., as depicted in FIG. 1), and/or in any other suitable location on the housing. The trigger may be disposed within the guard. The guard may be configured to protect the trigger from unintentional physical contact (e.g., an unintentional activation of the trigger). The guard may surround the trigger within the housing.

In various embodiments, the trigger may be coupled to an outer surface of the housing, and may be configured to move, slide, rotate, or otherwise become physically depressed or moved upon application of physical contact. For example, the trigger may be actuated by physical contact applied to the trigger from within the guard. The trigger may comprise a mechanical or electromechanical switch, button, trigger, or the like. For example, the trigger may comprise a switch, a pushbutton, and/or any other suitable type of trigger. The trigger may be mechanically and/or electronically coupled to the processing circuit. In response to the trigger being activated (e.g., depressed, pushed, etc. by the user), the processing circuit may enable deployment of one or more deployment units from the CEW, as discussed further herein.

In various embodiments, the power supply may be configured to provide power to various components of the CEW. For example, the power supply may provide energy for operating the electronic and/or electrical components (e.g., parts, subsystems, circuits, etc.) of the CEW and/or one or more deployment units. The power supply may provide electrical power. Providing electrical power may include providing a current at a voltage. The power supply may be electrically coupled to the processing circuit and/or the signal generator. In various embodiments, in response to a control interface comprising electronic properties and/or components, the power supply may be electrically coupled to the control interface. In various embodiments, in response to the trigger comprising electronic properties or components, the power supply may be electrically coupled to the trigger. In various embodiments, in response to the safety comprising electronic properties or components, the power supply may be electrically coupled to the safety. In various embodiments, the power supply may also be electrically coupled to a motion detector. As a further example, and in accordance with various embodiments, the power supply may also provide power to a laser for aiming, a flashlight, a launch controller, a communication circuit, a display, and/or the like.

Electrical power from the power supply may be provided as a direct current ("DC"). Electrical power from the power supply may be provided as an alternating current ("AC"). The power supply may include a battery. The energy of the power supply may be renewable, exhaustible, and/or replaceable. For example, the power supply may comprise one or more rechargeable or disposable batteries. In various embodiments, the energy from the power supply may be converted from one form (e.g., electrical, magnetic, thermal) to another form to perform the functions of a system. The power supply may provide energy for performing the functions of the CEW. For example, the power supply may provide the electrical current to the signal generator that is provided through a target to impede locomotion of the target (e.g., via a deployment unit and at least two electrodes). The power supply may provide the energy for a stimulus signal. The power supply may provide the energy for other signals, including an ignition signal and/or an integration signal, as discussed further herein.

In various embodiments, the processing circuit may comprise any circuitry, electrical components, electronic components, software, and/or the like configured to perform various operations and functions discussed herein. For example, the processing circuit may comprise a processing circuit, a processor, a digital signal processor, a microcontroller, a microprocessor, an application specific integrated circuit (ASIC), a programmable logic device, logic circuitry, state machines, MEMS devices, signal conditioning circuitry, communication circuitry, a computer, a computer-based system, a radio, a network appliance, a data bus, an address bus, and/or any combination thereof. In various embodiments, the processing circuit may include passive electronic devices (e.g., resistors, capacitors, inductors, etc.) and/or active electronic devices (e.g., op amps, comparators, analog-to-digital converters, digital-to-analog converters, programmable logic, SRCs, transistors, etc.). In various embodiments, the processing circuit may include data buses, output ports, input ports, timers, memory, arithmetic units, and/or the like.

The processing circuit may be configured to provide and/or receive electrical signals whether digital and/or analog in form. The processing circuit may provide and/or receive digital information via a data bus using any protocol. The processing circuit may receive information, manipulate the received information, and provide the manipulated information. The processing circuit may store information and retrieve stored information. Information received, stored, and/or manipulated by the processing circuit may be used to perform a function, control a function, and/or to perform an operation or execute a stored program.

The processing circuit may control the operation and/or function of other circuits and/or components of the CEW. The processing circuit may receive status information regarding the operation of other components, perform calculations with respect to the status information, and provide commands (e.g., instructions) to one or more other components. The processing circuit may command another component to start operation, continue operation, alter operation, suspend operation, cease operation, or the like. Commands and/or status may be communicated between the processing circuit and other circuits and/or components via any type of bus (e.g., SPI bus) including any type of data/address bus.

In various embodiments, the processing circuit may be mechanically and/or electronically coupled to the trigger. The processing circuit may be configured to detect an activation, actuation, depression, input, etc. (collectively, an "activation event") of the trigger. In response to detecting the activation event, the processing circuit may be configured to perform various operations and/or functions, as discussed further herein. The processing circuit may also include a sensor (e.g., a trigger sensor) attached to the trigger and configured to detect an activation event of the trigger. The sensor may comprise any suitable mechanical and/or electronic sensor capable of detecting an activation event in the trigger and reporting the activation event to the processing circuit.

In various embodiments, the processing circuit may be mechanically and/or electronically coupled to a control interface, such as a safety. The processing circuit may be configured to detect an activation, actuation, depression, input, etc. (collectively, a "control event") of the control interface. In response to detecting the control event, the processing circuit may be configured to perform various operations and/or functions, as discussed further herein. The processing circuit may also include a sensor (e.g., a control sensor) attached to the control interface and configured to detect a control event of the control interface. The sensor may comprise any suitable mechanical and/or electronic sensor capable of detecting a control event in the control interface and reporting the control event to the processing circuit.

In various embodiments, the processing circuit may be electrically and/or electronically coupled to the power supply. The processing circuit may receive power from the power supply. The power received from the power supply may be used by the processing circuit to receive signals, process signals, and transmit signals to various other components in the CEW. The processing circuit may use power from the power supply to detect an activation event of the trigger, a control event of a control interface, or the like, and generate one or more control signals in response to the detected events. The control signal may be based on the control event and the activation event. The control signal may be an electrical signal.

In various embodiments, the processing circuit may be electrically and/or electronically coupled to the signal generator. The processing circuit may be configured to transmit or provide control signals to the signal generator in response to detecting an activation event of the trigger. Multiple control signals may be provided from the processing circuit to the signal generator in series. In response to receiving the control signal, the signal generator may be configured to perform various functions and/or operations, as discussed further herein.

In various embodiments, the signal generator may be configured to receive one or more control signals from the processing circuit. The signal generator may provide an ignition signal to one or more deployment units or electrodes based on the control signals. The signal generator may be electrically and/or electronically coupled to the processing circuit and/or one or more deployment units. The signal generator may be electrically coupled to the power supply. The signal generator may use power received from the power supply to generate an ignition signal. For example, the signal generator may receive an electrical signal from the power supply that has first current and voltage values. The signal generator may transform the electrical signal into an ignition signal having second current and voltage values. The transformed second current and/or the transformed second voltage values may be different from the first current and/or voltage values. The transformed second current and/or the transformed second voltage values may be the same as the first current and/or voltage values. The signal generator may temporarily store power from the power supply and rely on the stored power entirely or in part to provide the ignition signal. The signal generator may also rely on received power from the power supply entirely or in part to provide the ignition signal, without needing to temporarily store power.

The signal generator may be controlled entirely or in part by the processing circuit. In various embodiments, the signal generator and the processing circuit may be separate components (e.g., physically distinct and/or logically discrete). The signal generator and the processing circuit may be a single component. For example, a control circuit within the housing may at least include the signal generator and the processing circuit. The control circuit may also include other components and/or arrangements, including those that further integrate corresponding function of these elements into a single component or circuit, as well as those that further separate certain functions into separate components or circuits.

The signal generator may be controlled by the control signals to generate an ignition signal having a predetermined current value or values. For example, the signal generator may include a current source. The control signal may be received by the signal generator to activate the current source at a current value of the current source. An additional control signal may be received to decrease a current of the current source. For example, the signal generator may include a pulse width modification circuit coupled between a current source and an output of the control circuit. A second control signal may be received by the signal generator to activate the pulse width modification circuit, thereby decreasing a non-zero period of a signal generated by the current source and an overall current of an ignition signal subsequently output by the control circuit. The pulse width modification circuit may be separate from a circuit of the current source or, alternatively, integrated within a circuit of the current source. Various other forms of signal generators may alternatively or additionally be employed, including those that apply a voltage over one or more different resistances to generate signals with different currents. In various embodiments, the signal generator may include a high-voltage module configured to deliver an electrical current having a high voltage. In various embodiments, the signal generator may include a low-voltage module configured to deliver an electrical current having a lower voltage, such as, for example, 2,000 volts.

Responsive to receipt of a signal indicating activation of the trigger (e.g., an activation event), a control circuit provides an ignition signal to one or more deployment units or electrodes. For example, the signal generator may provide an electrical signal as an ignition signal to a deployment unit in response to receiving a control signal from the processing circuit. In various embodiments, the ignition signal may be separate and distinct from a stimulus signal. For example, a stimulus signal in the CEW may be provided to a different circuit within a deployment unit, relative to a circuit to which an ignition signal is provided. The signal generator may be configured to generate a stimulus signal. In various embodiments, a second, separate signal generator, component, or circuit (not shown) within the housing may be configured to generate the stimulus signal. The signal generator may also provide a ground signal path for a deployment unit, thereby completing a circuit for an electrical signal provided to the deployment unit by the signal generator. The ground signal path may also be provided to the deployment unit by other elements in the housing, including the power supply.

In various embodiments, a deployment unit may comprise a propulsion system and a plurality of projectiles, such as, for example, a first projectile and a second projectile. The deployment unit may comprise any suitable or desired number of projectiles, such as, for example two projectiles, three projectiles, nine projectiles, ten projectiles, twelve projectiles, eighteen projectiles, and/or any other desired number of projectiles. Further, the housing may be configured to receive any suitable or desired number of deployment units, such as, for example, one deployment unit, two deployment units, three deployment units, etc.

In various embodiments, the propulsion system may be coupled to, or in communication with (directly or indirectly), each projectile in the deployment unit. In various embodiments, the deployment unit may comprise a plurality of propulsion systems, with each propulsion system coupled to, or in communication with, one or more projectiles. The propulsion system may comprise any device, propellant (e.g., air, gas, etc.), primer, chemical explosive (e.g., gunpowder, smokeless powder, black powder, etc.), or the like capable of providing a propulsion force in the deployment unit. The propulsion force may include an increase in pressure caused by rapidly expanding gas within an area or chamber. The propulsion force may be applied to one or more projectiles in the deployment unit to cause the deployment of the respective one or more projectiles. The propulsion system may provide the propulsion force in response to the deployment unit receiving the ignition signal.

In various embodiments, the propulsion force may be directly applied to one or more projectiles. For example, the propulsion force may be provided directly to a first projectile and/or a second projectile. The propulsion system may be in fluid communication with the projectiles to provide the propulsion force. For example, the propulsion force from the propulsion system may travel within a housing or channel of the deployment unit to one or more projectiles. The propulsion force may travel via a manifold in the deployment unit.

In various embodiments, the propulsion force may be provided indirectly to one or more projectiles. For example, the propulsion force may be provided to a secondary source of propellant within the propulsion system. The propulsion force may launch the secondary source of propellant within the propulsion system, causing the secondary source of propellant to release propellent. A force associated with the released propellant may in turn provide a force to the one or more projectiles. A force generated by a secondary source of propellent may cause the one or more projectiles to be deployed from the deployment unit and the CEW.

In various embodiments, a projectile may comprise any suitable type of projectile. For example, one or more projectiles may be or include an electrode (e.g., an electrode dart). An electrode may include a spear portion, designed to pierce or attach proximate a tissue of a target in order to provide a conductive electrical path between the electrode and the tissue, as previously discussed herein. For example, a projectile may include a respective electrode. A projectile may be deployed from a deployment unit at the same time or substantially the same time as a next projectile. A projectile may be launched by a same propulsion force from a common propulsion system as a next projectile. A projectile may also be launched by one or more propulsion forces received from one or more propulsion systems. A deployment unit may include an internal manifold configured to transfer a propulsion force from the propulsion system the projectile.

In various embodiments, a CEW may comprise one or more control interfaces. A control interface may be located in any suitable location on or in the housing. For example, a control interface may be coupled to an outer surface of the housing. A control interface may be electrically, mechanically, and/or electronically coupled to the processing circuit. In various embodiments, in response to a control interface comprising electronic properties or components, the control interface may be electrically coupled to the power supply. The control interface may receive power (e.g., electrical current) from the power supply to power the electronic properties or components.

In various embodiments, a control interface may be configured to control selection of firing modes in the CEW. Controlling selection of firing modes in the CEW may include disabling firing of the CEW (e.g., a safety mode, the disabled mode, an off-position, disengaged, safety inactive, disarmed, etc.).), enabling firing of the CEW (e.g., the enabled mode, an on-position, engaged, safety active, armed, etc.), controlling deployment of deployment units or electrodes, and/or similar operations, as discussed further herein.

For example, a control interface may include a safety. The safety may comprise any suitable electrical, electronic, mechanical, and/or electromechanical component. For example, the safety may comprise a switch, a touchscreen (or a portion of a touchscreen), and/or any other interface capable of operating to an enabled mode and to a disabled mode. While the safety is enabled (e.g., firing disabled) many of the functions (e.g., providing the stimulus signal, launching electrodes, enabling a flashlight, etc.) of the CEW are inactive and cannot be used. While the safety is disabled (e.g., safety enabled), many, if not all, of the functions of the CEW are active or may be activated by operating a control of the user interface.

Operating the safety from enabled to disabled may activate (or enable activation of) some functions (e.g., flashlight, lasers for aiming, communication circuit, motion detector, user interface, processing circuit, power to cartridges, etc.) while other functions (e.g., launch controller, signal generator, etc.) are activated by operation of another control (e.g., trigger, reactivate, etc.). Operating the safety from disabled to enabled is an indication that the user is no longer using the CEW, or that the user desires to disarm (or prevent activation of) the CEW.

In various embodiments, a control interface may include a user interface. A user interface may include one or more controls (e.g., switches, buttons, touch screen, etc.). A control includes any electrical, electronic, mechanical, or electromechanical device suitable for manual manipulation (e.g., operation) by a user. A control may establish or break an electrical circuit. A control may include a portion of a touch screen. A control may include any type of switch (e.g., pushbutton, rocker, key, rotary, slide, thumbwheel, toggle, etc.). Operation of a control may occur by the selection of a portion of a touch screen. Operation of a control may provide information to a CEW. Operation of a control may result in performance of a function, halting performance of a function, and/or resuming performance of a function of the CEW.

A control of a user interface may permit a user of the CEW to manually interact with and/or control the operation of the CEW. A processing circuit may detect the operation of a control. A processing circuit may perform a function of the CEW in response to an operation of a control. A processing circuit may perform a function, halt a function, resume a function, and/or suspend a function of the CEW responsive to operation of one or more controls. A control may provide analog or binary information to a processing circuit.

A user interface may provide information to a user. A user may receive visual and/or audible information from a user interface. A user may receive visual information via devices that visually display (e.g., present, show, etc.) information (e.g., LCDs, LEDs, light sources, graphical and/or textual display, display, monitor, touchscreen, etc.). A user may receive audible information via devices that audibly provide information (e.g., speakers, etc.). A user interface may include a communication circuit for transmitting information to an electronic device (e.g., smart phone, tablet, etc.) for presentation to a user. In various embodiments, the user interface may comprise the safety.

In various embodiments, a CEW may include a motion detector configured to detect motion and/or movement of the CEW. For example, the motion detector may include one or more detectors configured to determine whether the CEW is presently moving or has moved within a period of time. Movement may be detected along one or more axes. For example, one or more detectors may detect movement along an x-axis, a y-axis, and/or a z-axis of a Cartesian coordinate system. A change in the position and/or orientation of the CEW, or any portion thereof, from one coordinate in the coordinate system to another coordinate in the coordinate system may indicate movement of the CEW. Responsive to detecting movement or the lack of movement (e.g., stationary), a CEW may perform an operation, as discussed further herein.

The motion detector may be in electrical and/or electronic communication with the processing circuit and/or any other component of the CEW. In response to being an electronic device, the motion detector may be electrically coupled to the power supply.

Detectors may be used to detect movement in accordance with any coordinate system (e.g., polar, cylindrical, spherical, homogeneous, curvilinear, orthogonal, skew, log-polar, Plucker, Lagrangian, Hamiltonian, Barycentric, trilinear, etc.). Any type of detector or detectors may be used to detect movement of the CEW. Detectors (e.g., sensors) may include radar-based sensors, infrared sensors, microwave sensors, gyroscopes, ultrasonic detectors, acoustic sensors, optical sensors, vibration detectors, electromagnetic sensors, accelerometers, and/or any other device or component capable of detecting movement. In an implementation, an accelerometer is used to detect movement of the CEW. In an implementation, an accelerometer together with a second detector, such as a gyroscope, is used to detect movement of the CEW.

In various embodiments, and with reference to FIG. 1, a CEW 100 is disclosed. CEW 100 may be an implementation of any CEW discussed herein. CEW 100 may perform the functions of a CEW as discussed above. CEW 100 includes a handle 130, a cartridge 140, and a cartridge 142. Handle 130 may be similar to any handle or housing discussed herein. Cartridge 140 and/or cartridge 142 may be similar to any cartridge, deployment unit, or the like discussed herein.

Handle 130 includes a safety 120, a trigger 110, and/or a reactivate 150. Safety 120 and trigger 110 perform the functions of a safety (e.g., control interface) and a trigger respectively, as discussed above. Reactivate 150 performs the function of a control (e.g., button, switch, user interface, etc.) to provide an additional stimulus signal after launch of electrodes from cartridge 140 and/or cartridge 142. One or more of safety 120, trigger 110, and/or reactivate 150 may be part of a user interface.

Cartridge 140 and 142 may each include two or more electrodes, a propellant (or propulsion system) for launching the electrodes, and/or a processing circuit. The electrodes may be similar to any electrode, projectile, or the like discussed herein. In various embodiments, the processing circuit may also be located in handle 130. Handle 130 may provide signals to cartridge 140 and/or 142 to activate the propellant (or propulsion system) to launch the electrodes toward a target. The signals that launch the electrodes from a cartridge may be provided responsive to activation of trigger 110.

Handle 130 may provide a stimulus signal (e.g., via a signal generator) to cartridge 140 and/or 142. Electrodes from cartridges 140 and/or 142 may be launched toward a target. The electrodes may establish an electrical coupling with the target. The stimulus signal may be provided through target tissue via the electrodes to impede locomotion of the target. After delivery of an initial stimulus signal upon launch of electrodes, a further (e.g., a second, an additional, another, etc.) stimulus signal may be delivered via the launched electrodes in response to activating (e.g., pressing, switching, interfacing with) reactivate 150. CEW 100 may include one reactivate 150. A CEW may include a reactivate 150 for a number of cartridges CEW 100 is configured to receive. For example, operation of reactivate 150 may provide an additional stimulus signal via the launched electrodes of cartridge 142. Operation of another reactivate (not shown) may provide an additional stimulus signal via the launched electrodes of cartridge 140.

After use (e.g., launch of electrodes), cartridge 140 and/or cartridge 142 may be removed (e.g., detached, extracted, etc.) from handle 130 and replaced with an unused cartridge to launch additional electrodes to provide a stimulus signal through a target.

In various embodiments, handle 130 may further include a first side 160 and a second side 162 opposite first side 160. First side 160 (e.g., a right side) may be proximate a first cartridge of CEW 100. For example, first side 160 may be proximate cartridge 140. Second side 162 (e.g., a left side) may be proximate a second cartridge of CEW 100. For example, second side 162 may be proximate cartridge 142.

In various embodiments, handle 130 may include a third side 164 opposite a fourth side 166. Third side 164 (e.g., a top side) may be positioned between first side 160 and second side 162 proximate a top of CEW 100. Third side 164 may interconnect first side 160 and second side 162. Third side 164 may be positioned perpendicularly relative to one or more of first side 160 and second side 162. Fourth side 166 (e.g., a bottom side) may be positioned between first side 160 and second side 162 proximate a bottom of CEW 100. Fourth side 166 may interconnect first side 160 and second side 162. Fourth side 166 may be positioned perpendicularly relative to one or more of first side 160 and second side 162. Third side 164 and/or fourth side 166 may be positioned about a central axis of CEW 100 along which at least one electrode is configured to be launched from CEW 100.

First side 160, second side 162, third side 164, and/or fourth side 166 may collectively form a bay (or plurality of bays) of CEW 100 configured to receive the one or more cartridges (e.g., cartridge 140 and cartridge 142).

Figure 2:
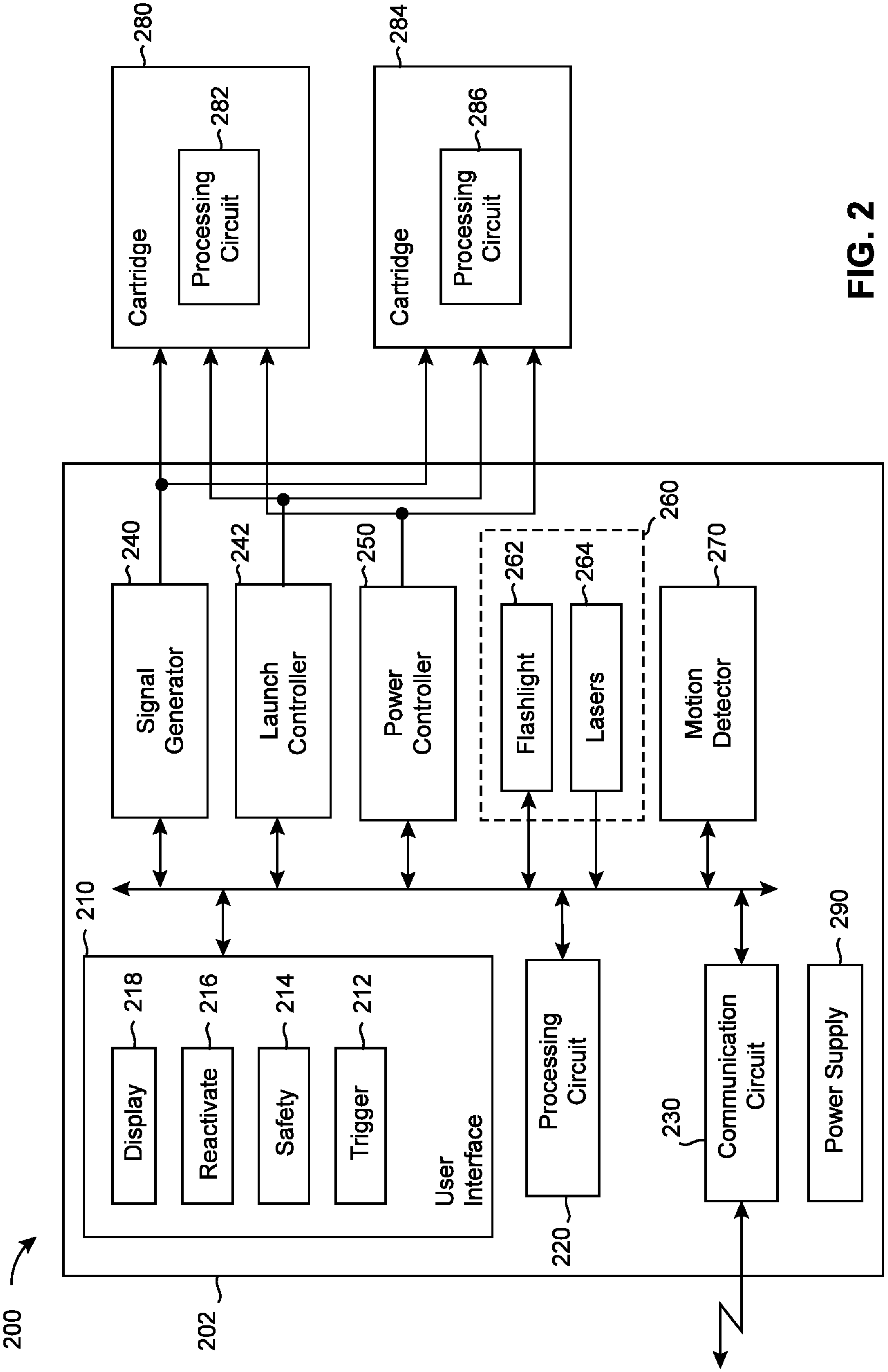
FIG. 2 is a block diagram of a CEW, in accordance with various embodiments.

In various embodiments, and with reference to FIG. 2, a CEW 200 is disclosed. CEW 200 may be an implementation of a CEW as previously discussed above. CEW 200 may include a handle 202, a cartridge 280, and a cartridge 284. CEW 200 and handle 202 perform the functions of a CEW and a handle respectively, as previously discussed above. Cartridge 280 and cartridge 284 each perform the functions of a cartridge as previously discussed above.

Handle 202 may include one or more of a user interface 210, a processing circuit 220, a communication circuit 230, a signal generator 240, a launch controller 242, a power controller 250, an accessory 260 (e.g., accessories 260), a motion detector 270, and/or a power supply 290.

In various embodiments, user interface 210 may be similar to any other user interface, control interface, or the like disclosed herein. User interface 210 may comprise one or more of a display 218, a reactivate 216, a safety 214, and/or a trigger 212. Display 218 may be similar to any other display, output interface, or the like disclosed herein, and may be configured to provide information to a user of CEW 200 (e.g., visually, audibly, haptically, etc.). Reactivate 216 may be similar to any other reactivate switch or the like disclosed herein, and may be configured to provide additional stimulus signal through a target. Safety 214 may be similar to any other safety, control interface, or the like disclosed herein, and may be configured to enable and/or disable deployment of cartridges and/or electrodes from CEW 200. Safety 214 may also be configured to power on and off CEW 200, and/or enable or disable one or more other components of CEW 200. Trigger 212 may be similar to any other trigger or operating interface disclosed herein, and may be configured to cause deployment of one or more cartridges or electrodes from CEW 200.

In various embodiments, processing circuit 220 may be similar to any other processor, processing circuit, or the like disclosed herein. A processing circuit includes any circuitry, electrical components, electronic components, software, computer-readable mediums, and/or the like configured to perform various operations and functions. A processing circuit may include circuitry that performs (e.g., executes) a stored program. A processing circuit may include a processor, a digital signal processor, a microcontroller, a microprocessor, an application specific integrated circuit (ASIC), a programmable logic device, logic circuitry, state machines, MEMS devices, signal conditioning circuitry, communication circuitry, a computer, a computer-based system, a radio, a network appliance, a data bus, an address bus, and/or the like.

A processing circuit may include passive electronic devices (e.g., resistors, capacitors, inductors, etc.) and/or active electronic devices (e.g., op amps, comparators, analog-to-digital converters, digital-to-analog converters, programmable logic, SRCs, transistors, etc.). A processing circuit may include data buses, output ports, input ports, timers, memory, arithmetic units, and/or the like.

A processing circuit may provide and/or receive electrical signals whether digital and/or analog in form. A processing circuit may provide and/or receive digital information via a data bus using any protocol. A processing circuit may receive information, manipulate information, and provide manipulated information. A processing circuit may store information and retrieve stored information. A processing circuit may include memory for storage and/or retrieval of information. Information received, stored, and/or manipulated by a processing circuit may be used to perform a function, control a function, and/or to perform (e.g., execute) a stored program.

A processing circuit may control the operation and/or function of other circuits and/or components of a system such as a CEW. A processing circuit may receive status information regarding the operation of other components, perform calculations with respect to the status information, and provide commands (e.g., instructions) to one or more other components. A processing circuit may command another component to start operation, continue operation, alter operation, suspend operation, or cease operation. Commands and/or status may be communicated between a processing circuit and other circuits and/or components via any type of bus (e.g., SPI bus) including any type of data/address bus.

A processing circuit may include or be in electronic communication with a computer-readable medium. The computer-readable medium may store, retrieve, and/or organize data. As used herein, the term "computer-readable medium" includes any storage medium that is readable by a machine (e.g., computer, processor, processing circuit, etc.). Storage medium includes any devices, materials, and/or structures used to place, keep, and retrieve data (e.g., information). A storage medium may be volatile or non-volatile. A storage medium may include any semiconductor (e.g., RAM, ROM, EPROM, flash, etc.), magnetic (e.g., hard disk drive (HDD), etc.), solid state (e.g., solid-state drive (SSD), etc.), optical technology (e.g., CD, DVD, etc.), or combination thereof. Computer-readable medium includes storage medium that is removable or non-removable from a system. Computer-readable medium may store any type of information, organized in any manner, and usable for any purpose such as computer readable instructions, data structures, program modules, or other data. The computer-readable medium may comprise a non-transitory computer-readable medium. The non-transitory computer-readable medium may include instructions stored thereon. Upon execution by the processing circuit, the instructions may allow the processing circuit to perform various functions and operations disclosed herein.

In various embodiments, communication circuit 230 may be similar to any other communication circuit, communication module, or the like disclosed herein. Communication circuit 230 may be configured to enable short-range communications and/or long-range communications between CEW 200 and one or more other electronic devices. Communication circuit 230 may comprise any suitable hardware and/or software components capable of enabling the transmission and/or reception of data. Communication circuit 230 may enable electronic communications between devices and systems. Communication circuit 230 may enable communications over a network. Examples of a communications circuit may include a modem, a network interface (such as an Ethernet card), a communications port, etc. Data may be transferred via a communications circuit in the form of signals which may be electronic, electromagnetic, optical, or other signals capable of being transmitted or received by a communications circuit. A communications circuit may be configured to communicate via any wired or wireless protocol such as a CAN bus protocol, an Ethernet physical layer protocol (e.g., those using 10 BASE-T, 100 BASE-T, 1000 BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZigBee® protocol maintained by the ZigBee alliance), a cellular protocol, an infrared protocol, an optical protocol, or any other protocol capable of transmitting information via a wired or wireless connection.

In various embodiments, signal generator 240 may be similar to any other signal generator or the like disclosed here. A signal generator provides a signal (e.g., stimulus signal, current, current pulse, a series of current pulses, stimulus signal, etc.). A signal may include a pulse of current. A signal may include two or more (e.g., a series of) current pulses. A current pulse provided by a signal generator may include a high voltage portion for electrically coupling a CEW to a target. The high voltage portion of a pulse may ionize air in one or more gaps in series with the signal generator. Ionizing air may establish one or more ionization paths to deliver the current pulse through target tissue. A pulse may provide an amount of charge to target tissue. A signal generator may provide current pulses at a rate of so many pulses per second. The signal comprised of the pulses of current (e.g., stimulus signal) may interfere with (e.g., impede) locomotion of the target. The signal may impede locomotion by inducing fear, pain, and/or NMI.

The pulses of a stimulus signal may be delivered at a rate (e.g., 22 pps, 44 pps, 50 pps, etc.) for a period of time (e.g., 5 seconds, 10 seconds, etc.). Each pulse of the stimulus signal may provide an amount of charge (e.g., 63 microcoulombs, etc.). Each pulse may establish electrical connectivity (e.g., ionizing air in one or more gaps) and interfere with locomotion of the target by providing an amount of charge per pulse to target tissue.

A signal generator includes circuits for receiving electrical energy and for providing the stimulus signal. Electrical/electronic circuits (e.g., components) of a signal generator may include capacitors, resistors, inductors, spark gaps, transformers, silicon-controlled rectifiers ("SCRs"), analog-to-digital converters, and/or the like. A processing circuit may cooperate with and/or control the circuits of a signal generator to produce a stimulus signal.

A signal generator may receive electrical energy from a power supply. A signal generator may convert the energy from one form of energy into a stimulus signal for ionizing gaps of air and interfering with locomotion of a target. A processing circuit may cooperate with and/or control a power supply in its provision of energy to a signal generator. A processing circuit may cooperate with and/or control a signal generator in converting the received electrical energy into a stimulus signal. A processing circuit may cooperate with and/or control a signal generator to select a pair of electrodes for providing the stimulus signal.

In various embodiments, launch controller 242 may be similar to any other launch controller, signal generator, or the like disclosed herein. Launch controller 242 may be configured to control deployment of one or more electrodes from CEW 200. For example, launch controller 242 initiates the launch of the electrodes from a cartridge by igniting the pyrotechnic in the cartridge. Signal generator 240 generates the stimulus signal and provides the stimulus signal through the target via the launched electrodes. Launch controller 242 may comprise a separate component, or may be integrated into at least one of processing circuit 220 and/or signal generator 240.

In various embodiments, power supply 290 may be similar to any other power supply, battery, or the like disclosed herein. Power supply 290 provides the power (e.g., electrical) to perform the functions of CEW 200. Power supply 290 may be implemented as a battery. Power supply 290 may provide power to the components of handle 202, cartridge 280 and cartridge 284.

In various embodiments, power controller 250 may control which components of CEW 200 receive power from power supply 290. Power controller 250 may permit (e.g., control, direct, etc.) power to be supplied to a component or removed from a component. Power controller 250 may provide power to or remove power from (e.g., cease to provide power to) a component in response to an event or operation of CEW 200. Power controller 250 may cooperate with processing circuit 220 to provide power to and/or remove power from a component of CEW 200. Some or all of the functions of power controller 250 may be performed by processing circuit 220. Power controller 250 may be controlled, wholly or in part, by processing circuit 220.

In various embodiments, cartridges 280, 284 may be similar to any other cartridge, deployment unit, or the like disclosed here. Cartridges 280, 284 may each comprise one or more electrodes similar to any other electrode, projectile, or the like disclosed herein. An electrode couples to a filament and is launched toward a target to deliver a current through the target. An electrode may include aerodynamic structures to improve accuracy of flight of the electrode toward the target. An electrode may include structures (e.g., spear, barbs, etc.) for mechanically coupling to a target.

A filament (e.g., wire, wire tether, etc.) conducts a current. A filament electrically couples a signal generator to an electrode. A filament carries a current at a voltage for ionizing air in one or more gaps and/or impeding locomotion. A filament mechanically couples to an electrode. A filament mechanically couples to an interface of a cartridge. A filament deploys from a store (e.g., cavity) in an electrode (or in the cartridge) upon launch of the electrode. Movement of an electrode toward a target deploys (e.g., pulls) the filament from the store to deploy the filament. A filament extends (e.g., stretches, is positioned, etc.) between a cartridge and a target. The cartridge electrically couples to a signal generator for providing a stimulus signal to a target via the filament and an electrode.

Each electrode may be deployed using any suitable source of force. For example, cartridges 280, 284 may comprise a propellant, propulsion system, primer, or the like configured to deploy one or more electrodes. A propellant propels (e.g., launches) one or more electrodes from a cartridge toward a target. A propellant applies a force (e.g., from expanding gas) on a surface of the one or more electrodes to push (e.g., launch) the one or more electrodes from the cartridge toward the target. The force applied to the one or more electrodes is sufficient to accelerate the electrodes to a velocity suitable for traversing a distance to a target, for deploying the respective filaments stowed in the one or more electrodes (or in the cartridge), and for coupling, if possible, the electrodes to the target. A processing circuit may ignite (or cause to ignite) a propellant to launch electrodes. A processing circuit may provide a signal for igniting (or causing to ignite) the propellant. A processing circuit may ignite (or cause to ignite) a propellant in response to operation of a control (e.g., trigger 110/212, with brief reference to FIGS. 1 and 2). A processing circuit may cooperate with a launch controller to ignite (or cause to ignite) a propellant.

In various embodiments, a cartridge may include one or more electrodes configured to be deployed at different angles relative to a central axis of CEW 200. For example, a first electrode in a cartridge may be configured to be deployed at a same angle as a central axis of CEW 200 while a second electrode in the cartridge is configured to be deployed at an angle different from the central axis of CEW 200. As a further example, one or more electrodes in a cartridge may comprise similar or different deployment angles (e.g., a wide angle for short-range deployments, a small angle for long-range deployments, etc.).

In various embodiments, a cartridge may comprise electrodes disposed at a deployment angle configured for a short-range deployment, a long-range deployment, or the like. As previously discussed, the likelihood that a stimulus signal will cause NMI increases when the electrodes that deliver the stimulus signal are spaced apart at least 6 inches (15.24 centimeters) on a target so that the current from the stimulus signal flows through the at least 6 inches of the target's tissue. In some embodiments, the electrodes preferably should be spaced apart at least 12 inches (30.48 centimeters) on the target. In that respect, a cartridge configured to be deployed at a short-range (e.g., close quarters) may comprise electrodes disposed at a greater deployment angle than a cartridge configured to be deployed at a long-range (e.g., standoff), which may comprise electrodes disposed at a lesser deployment angle (relative to a short-range cartridge).

For example, the greater deployment angle may be configured to ensure that electrodes achieve proper or desirable spacing on a target, in response to the CEW being deployed at a short range. As a non-limiting example, a "greater deployment angle" may refer to any deployment angle suitable for a short-range deployment, such as, for example, a deployment angle greater than 10 degrees. In some embodiments, a "greater deployment angle" may comprise a deployment angle of 12 degrees. The lesser deployment angle may be configured to ensure that electrodes achieve proper or desirable spacing on a target in response to the CWE being deployed at a long range. As a non-limiting example, a "lesser deployment angle" may refer to any deployment angle suitable for a long-range deployment, such as, for example, a deployment angle less than 10 degrees. In some embodiments, a "lesser deployment angle" may comprise a deployment angle of 3.5 degrees.

In various embodiments, a cartridge may be configured to deploy different numbers of electrodes responsive to a trigger activation. For example, a cartridge may be configured to deploy a single electrode, two electrodes, three electrodes, or any other number of electrodes responsive to a trigger activation.

In various embodiments, a processing circuit of a CEW handle may be configured to control the number of electrodes deployed responsive to a trigger activation. The processing circuit may communicate with the cartridge to determine the availability or option of deployment different numbers of electrodes. For example, a cartridge may be configured to deploy only two electrodes at a time. The processing circuit may communicate with the cartridge and may only enable deployment of two electrodes at a time. As a further example, a cartridge may be configured to allow for the deployment of one electrode, two electrodes, and/or any other number of electrodes at a time. The processing circuit may communicate with the cartridge and may enable electrode number deployment based on the availability or deployment options of the cartridge, together with an input from the user.

In various embodiments, a cartridge may comprise one or more different types of electrodes. For example, an electrode type may comprise, a standard CEW electrode, a low penetrating electrode, an article penetrating electrode, an other less-lethal projectile or electrode, or the like. In some embodiments, a cartridge may comprise a plurality of different electrode types. In some embodiments, a cartridge may comprise a single electrode type. As previously discussed, a CEW may be configured to receive a plurality of cartridges. In that respect, a CEW may house a first cartridge comprising a first electrode type and a second cartridge comprising a different, second electrode type.

In various embodiments, a cartridge may comprise a cartridge identifier configured to provide information regarding one or more of the above-discussed cartridge attributes. For example, a cartridge attribute may comprise a cartridge type (e.g., long-range cartridge, short-range cartridge, etc.), an electrode type (e.g., cartridge electrodes type, individual electrode type, etc.), an electrode number (e.g., two electrodes, four electrodes, ten electrodes, etc.), an electrode deployment number (e.g., one electrode deployed at a time, two electrodes deployed at a time, three electrodes deployed at a time, etc.), an electrode deployment angle (e.g., a first electrode deployment angle, a second electrode deployment angle, etc.) and/or the like.

The cartridge identifier may comprise any suitable indicia capable of indicating the cartridge attributes. For example, a cartridge identifier may comprise a static identifier such as a bar code, a QR code, or the like, printed on an outer surface of the cartridge. A processing circuit of a CEW may be configured to read or receive information from the cartridge to determine the cartridge identifier. As a further example, a cartridge identifier may comprise an electronic component such as a processing circuit, an RFID (radio-frequency identification) transponder, an NFC (near field communication) transmitter, or the like. The electronic component may be configured to communicate with an electronic component of the CEW.

In various embodiments, cartridge 280 and 284 include a processing circuit 282 and a processing circuit 286, respectively. Processing circuits 280, 286 may be similar to any other processing circuit, processor, or the like disclosed herein. Processing circuits 282, 286 receive power from handle 202. Power controller 250 and/or processing circuit 220 controls whether power is provided to processing circuit 282 and/or processing circuit 286.

In various embodiments, accessories 260 may include one or more of a flashlight 262 and/or lasers 264. Flashlight 262 may comprise a light-emitting component coupled to an external surface of CEW 200 or integrated within CEW 200. Flashlight 262 may comprise a tactical flashlight, such as, for example, a high-lumen light emitting component. Flashlight 262 may provide a visual output configured to illuminate an object or location. Flashlight 262 may also provide a visual output configured to disorient a target (e.g., via a bright light). Flashlight 262 may be controlled, wholly or in part, by processing circuit 220. Flashlight 262 may also be controlled responsive to a user input from a user interface, such as, for example, activation of a safety, a switch, or the like.

In various embodiments, lasers 264 may be configured to aid a user in accurately aiming CEW 200 towards a target. For example, lasers 264 may comprise one or more laser outputs configured to at least partially visually depict the trajectory of one or projectiles from CEW 200. In various embodiments, lasers 264 may be configured to provide a visual indication of a cartridge, electrode, or electrodes selected for launch. For example, the visual indication of lasers 264 may indicate an expected flight path of one or more electrodes from the cartridge selected for launch. In response to lasers 264 being oriented toward a target, the visual indication may indicate one or more locations on the target at which the one or more electrodes are expected to contact upon activation of trigger 212 (and deployment of the electrodes).

In various embodiments, lasers 264 may provide different visual indications for different types of selected cartridges (e.g., based on a cartridge attribute of the selected cartridge). Each different visual indication of the different visual indications may include at least one beam of light being emitted from lasers 264 at a different, respective angle from CEW 200. For example, a first visual indication of the different visual indications may include a first beam of light emitted at a first angle from CEW 200 and a second visual indication of the different visual indications may include a second beam of light emitted at a second angle from CEW 200, wherein the second angle is different from the first angle. Each different angle may be determined relative to one of a central axis of CEW 200 along which at least one electrode is configured to be launched and/or another beam of light emitted from CEW 200 for the respective visual indication. The first visual indication may be associated with a narrow angle, while the second visual angle may be associated with a wider angle, relative to the narrow angle of the first visual indication. In embodiments, the first visual indication may be associated with a stand-off or long-range cartridge. In embodiments, the second visual indication may be associated with a close-quarters or short-range cartridge.

In various embodiments, a CEW 200 may also comprise any other accessory. For example, CEW 200 may comprise an audio output system configured to output sounds via a speaker.

A detector detects (e.g., measures, witnesses, discovers, monitors, etc.) a physical property (e.g., intensive, extensive, isotropic, anisotropic, etc.). A physical property may include any physical property such as, for example, acceleration, a force of gravity, capacitance, electric charge, electric impedance, and electric potential. A detector may detect a quantity, a magnitude, and/or a change in a physical property. A detector may detect a physical property and/or a change in a physical property directly and/or indirectly. A detector may detect a physical property and/or a change in a physical property of an object. A detector may detect a physical quantity (e.g., extensive, intensive). A detector may detect a change in a physical quantity directly and/or indirectly. A physical quantity may include an amount of time, an elapse (e.g., lapse, expiration) of time, an electric current, an amount of electrical charge, a current density, an amount (e.g., magnitude) of capacitance, an amount of resistance, a magnitude (e.g., value) of a voltage and/or a current. A detector may detect one or more physical properties and/or physical quantities at the same time or at least partially at the same time.

A detector may transform a detected physical property from one physical property to another physical property (e.g., electrical to kinetic). A detector may transform (e.g., mathematical transformation) a detected physical quantity. A detector may relate a detected physical property and/or physical quantity to another physical property and/or physical quantity. A detector may detect one physical property and/or physical quantity and deduce the existence of another physical property and/or physical quantity.

A detector may cooperate with a processing circuit, such as processing circuit 220, or may include an integrated processing circuit for detecting, transforming, relating, and/or deducing physical properties and/or physical quantities. A processing circuit may include any circuit for detecting, transforming, relating, and/or deducing physical properties and/or physical quantities.

For example, a processing circuit may include a voltage sensor, a current sensor, a charge sensor, a light sensor, a heat sensor (e.g., thermometer), an electromagnetic signal sensor, and/or any other suitable or desired sensor.

A detector may provide information (e.g., report). A detector may provide information regarding a physical property and/or a change in a physical property. A detector may provide information regarding a physical quantity (e.g., magnitude) and/or a change in a physical quantity. A detector may provide information to a processing circuit.

A detector may detect physical properties for determining whether a current was delivered to a target.

A motion detector detects motion. A motion detector may detect a physical quantity (e.g., heat, electricity, vibration, radio wave, electromagnetic wave, gravity, etc.) to detect motion. A motion detector may detect motion in one or more directions. A motion detector may detect and/or relate detection of motion, or the lack thereof, to any coordinate system.

In various embodiments, CEW 200 may comprise one or more detectors, such as motion detector 270. A motion detector may provide information (e.g., data, signal) responsive to detecting motion and/or to detecting a lack (e.g., absence) of motion. A motion detector may provide raw (e.g., unprocessed, without calculations) data to one or more components to perform one or more computations. A computation may include detecting motion or a lack of motion. A processing circuit may receive information from a motion detector. A processing circuit may perform computations to determine whether the motion detector has detected or not detected motion.

A motion detector may detect a force of gravity. A motion detector may use the force of gravity to detect movement of the CEW. A motion detector may use (e.g., factor in) or exclude (e.g., factor out) a force of gravity in the information reported by the detector. A motion detector may exclude the force of gravity to report movement related to movement of the CEW only.

A motion detector may measure a passage of time. A motion detector may provide information regarding detecting motion or the absence thereof for a period of time. A motion detector may cooperate with a processing circuit to measure a passage of time. Information provided by a motion detector may include data and/or a signal. Information may include providing a signal when a CEW does not move for a period of time. Information may include providing a signal each instance motion of a CEW is detected. Information may include providing a signal each instance motion of a CEW is detected for a period of time.

A processing circuit may receive information from a motion detector. A processing circuit, as opposed to the motion detector or in cooperation with the motion detector, may measure a passage of time. A processing circuit may use information provided by a motion detector to determine whether a CEW has moved or not moved during a period of time. A processing circuit may perform an operation in response to motion, or a lack of motion, of a CEW. A processing circuit may perform an operation in response to motion, or a lack of motion, detected during a period of time.

As discussed above, a processing circuit, power controller, and/or motion detector may track (e.g., monitor, measure, calculate, etc.) one or more periods of time and perform an operation in accordance with detecting motion or detecting a lack of motion during the one or more periods of time.

In an implementation, motion detector 270 reports motion data to processing circuit 220. Processing circuit 220 performs calculations on the motion data provided by motion detector 270 to determine whether CEW 200 is moving or is stationary. For example, motion detector 270 reports motion along an x-axis, a y-axis, and/or a z-axis. Processing circuit 220 determines whether the motion reported along the axes corresponds to movement of CEW 200. Processing circuit 220 may use the data from motion detector 270 to detect movement in any direction (e.g., along any axis).

In response to the calculations performed by processing circuit 220, processing circuit cooperates with one or more components of CEW 200 to perform operations. In one implementation, processing circuit 220 may further measure the passage of time to detect a lack of motion for one or more periods of time. Processing circuit 220 may perform operations in response to detecting motion or detecting a lack of motion during a period of time and/or after the lapse of a period of time.

In one implementation, motion detector 270 detects motion and performs calculations on the motion data to determine whether CEW 200 has moved or not moved. Motion detector 270 may detect movement in any direction. Motion detector 270 may measure a passage of time. Motion detector 270 may detect motion or the lack of motion of CEW 200 during one or more periods of time. Motion detector 270 may report motion or the lack of motion during one or more periods of time to processing circuit 220 and/or power controller 250. Processing circuit 220 may respond to information provided by motion detector 270 to perform one or more operations of CEW 200.

For example, motion detector 270 detects movement of CEW 200 along the axes of a Cartesian coordinate system (e.g., x-axis, y-axis, z-axis). Motion detector 270 and/or processing circuit 220 measures the lapse of a period of time. In response to motion detector 270 detecting motion during the period of time, processing circuit 220 performs an operation of CEW 200.

The period of time may be of any duration. The duration of the period of time may be programmable. The duration of the period of time may be programmable by a user of the CEW. The duration of the period of time may be determined and programmed by a department that issued and/or controls the CEW. The period of time may correspond to one or more seconds, minutes, or hours. Time and a duration of time may be measured by a clock. Handle 202, and in particular processing circuit 220 and/or motion detector 270, may include a crystal for tracking and/or measuring time, a real-time clock, a network-based time resource, and/or any other hardware or software component configured to provide or measure time.

Motion detector 270 in communication with processing circuit 220 may be configured to detect a sequence of motions. The sequence of motions may comprise a first motion, a second motion, and/or any other number of motions (e.g., a first motion, a second motion, a third motion, etc.). Each motion may be detected during a same time period or one or more different time periods. In some embodiments, the first motion may be detected during a first time period while a second motion is detected during a second time. In some embodiments, a first motion and a second motion may be detected during a same time period. In some embodiments, a first motion and a second motion may be detected during a same time period, and a third motion may be detected during a next time period.

The second (or next) period of time may begin after expiration of the first period of time (e.g., serial measurement). All periods of time may be measured serially, such that a subsequent period begins after the lapse of a previous period. In one embodiment, each period of time may comprise an equal duration. In one embodiment, one or more periods of time may comprise a duration longer than or shorter than the duration of at least one other period of time. For example, each period of time may be customizable based on user input, may be preprogrammed, and/or the like.

Figure 3:
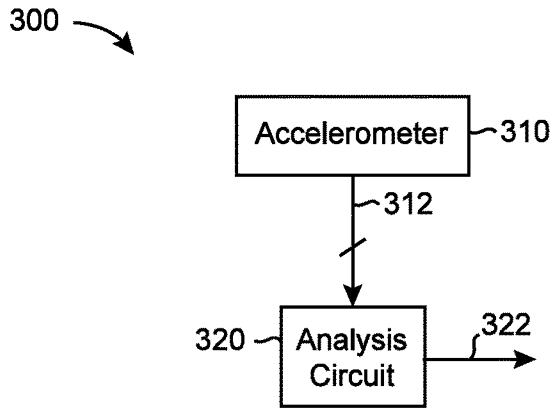
FIG. 3 is a block diagram of a motion detector for a CEW, in accordance with various embodiments.

In various embodiments, and with reference to FIG. 3, an implementation of a motion detector 300 is disclosed. Motion detector 300 is an implementation of a motion detector that performs the functions of a motion detector and/or motion detector 270, as discussed above. Motion detector 300 may comprise one or more components configured to perform the functions of a motion detector, such as, for example, an acceleration sensor, a vibration sensor, a shock sensor, a tilt sensor, a rotation sensor, or the like. For example, motion detector 300 may comprise an accelerometer, a gyroscope, a magnetometer, and/or any other sensor or detector configured to detect motion.

In various embodiments, motion detector 300 may include an accelerometer 310 and/or an analysis circuit 320. Analysis circuit 320 may be similar to any other processing circuit, processor, or the like disclosed herein. In some embodiments, motion detector 300 may also comprise one or more other components configured to at least partially aid in performing the function of a motion detector, such as, for example, a gyroscope.

In various embodiments, a motion detector may also implement one or more filters configured to decrease sensitivity and/or increase accuracy of detecting motion in a CEW. For example, a motion detector may implement one or more low-pass filters, high-pass filters, a signal processing filter (e.g., a finite impulse response filter ("FIR filter")), or the like. For example, a filter for a motion detector may be configured to ignore or eliminate motion or movement of a smaller value to provide greater confidence that a detected motion is a motion that represents a purposeful movement of the CEW, and not merely a fluctuation of a sensitive component of a motion detector.

A gyroscope measures orientation and angular velocity. A gyroscope may measure the angular rate of rotational movement about one or more axes. A gyroscope may measure complex motion accurately in multiple dimensions, tracking the position and rotation of a moving object (e.g., CEW). A gyroscope may detect (e.g., measure) motion in accordance with a coordinate system. A gyroscope may detect motion in accordance with a Cartesian coordinate system. A gyroscope may detect motion or a movement along one or more axes of a coordinate system.

An accelerometer detects acceleration. Detecting acceleration may include detecting a change in speed (e.g., velocity) over time and/or a change in direction over time. An accelerometer may detect the static and dynamic forces of acceleration. An accelerometer may detect acceleration of the object (e.g., CEW) that holds (e.g., contains, connected to) the accelerometer (e.g., dynamic acceleration) and acceleration due to the force of gravity (e.g., static acceleration). In other words, an accelerometer may detect the dynamic translational acceleration of the object to which the accelerometer is coupled and the static force of gravity acting on the object.

Figure 4:
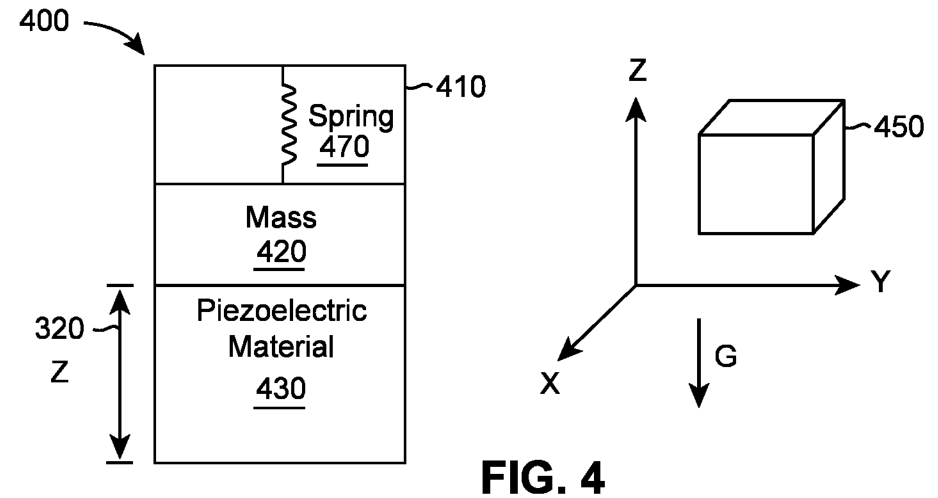
FIGS. 4-6 are block diagrams of an accelerometer, in accordance with various embodiments.
Figure 5:
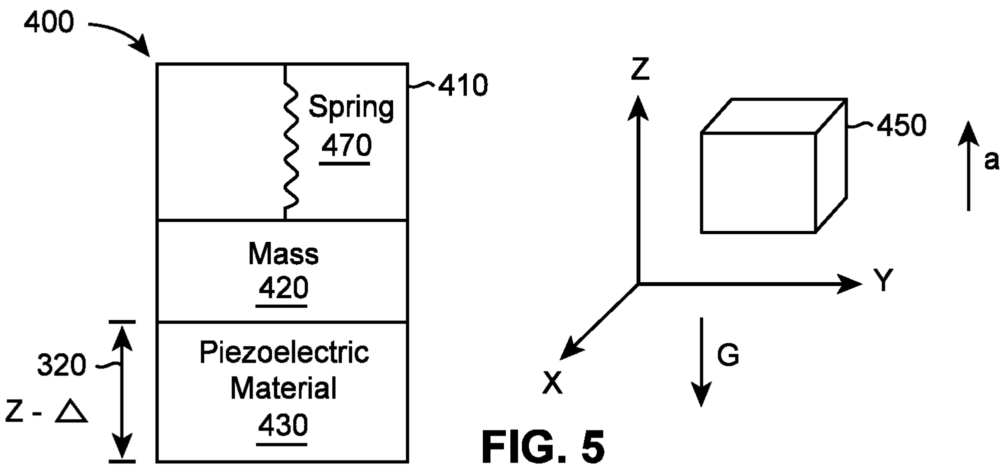
Figure 6:
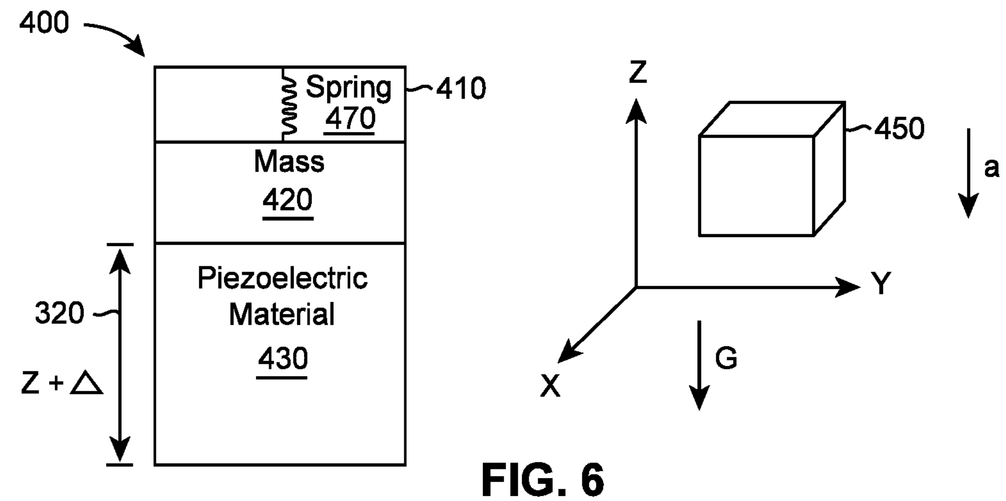

For example, referring to FIGS. 4-6, a detector 400 is a detector (e.g., sensor) in an implementation of an accelerometer (e.g., accelerometer 310, with brief reference to FIG. 3) that detects dynamic forces of acceleration of an object 450 (e.g., a CEW) and the static force of gravity G that acts on object 450. Detector 400 may be oriented to detect dynamic and static forces along the z-axis. When object 450 is stationary, with specific reference to FIG. 4, a mass 420 presses on a piezoelectric material 430 due to the force of gravity G. The force of gravity G pulls on mass 420 so that it compresses piezoelectric material 430 to a height (e.g., distance) Z. While piezoelectric material 430 is compressed to height Z, piezoelectric material 430 provides voltage V1. While object 450 is not moving, detector 400 detects the force of gravity, but not any dynamic acceleration from the movement of object 450. The compression of piezoelectric material 430 to height Z is the compressed height when object 450 is not moving.

When object 450 accelerates in the positive Z direction (e.g., upward), with specific reference to FIG. 5, dynamic acceleration force "a" and static gravitational force G act on object 450. Dynamic force of acceleration "a" and static force G causes mass 420 to compress piezoelectric material 430 to height Z−delta. While piezoelectric material 430 is compressed to height Z−delta, piezoelectric material 430 provides voltage V2. The change of the voltage provided by piezoelectric material 430 from V1 to V2 indicates an acceleration of object 450 in the positive Z direction. The change in the voltage from V1 to V2 may include providing voltages that range between voltage V1 and V2 until voltage V2 is reached.

When object 450 stops accelerating (e.g., reaches constant velocity) in the positive Z direction, the dynamic force of acceleration "a" is zero, but the static force of gravity G remains, so the compressed height of piezoelectric material 430 returns to height Z. Object 450 may still be moving in the positive Z direction, but it has stopped accelerating.

When object 450 accelerates in the negative Z direction (e.g., downward), with specific reference to FIG. 6, dynamic acceleration force "a" and static gravitational force G act on object 450. Dynamic force of acceleration "a" and static force G causes mass 420 to compress piezoelectric material 430 to height Z+delta. While piezoelectric material 430 is compressed to height Z+delta, piezoelectric material 430 provides voltage V3. The change of the voltage from piezoelectric material 430 to V3 indicates acceleration of object 450 in the negative Z direction.

The amount of compression or decompression of piezoelectric material 430 by mass 420 will depend on the force of dynamic acceleration "a" combined with the static force of gravity G. The change in compression of +/−delta is for a particular amount of acceleration. The change in compression or decompression will be different for accelerations of greater or lesser magnitudes. The magnitude of the voltages provided by piezoelectric material 430 will different in accordance with the magnitude of the acceleration.

However, when object 450 stops accelerating, whether upward or downward, or returns to rest, the compression of piezoelectric material 430 returns to the amount of compression (e.g., Z) due to the force of gravity G alone.

An accelerometer may detect (e.g., measure) acceleration in accordance with a coordinate system. An accelerometer may detect acceleration in accordance with a Cartesian coordinate system. An accelerometer may detect an acceleration along one or more axes of a coordinate system. For example, detector 400 of FIGS. 4-6 detects acceleration along the Z axis of a Cartesian coordinate system. A second detector 400 and a third detector 400 may be oriented along axes X and Y respectively so that an accelerometer comprised of the three detectors could detect acceleration in three dimensions.

An accelerometer may provide data (e.g., signals, V1, V2, V3) regarding acceleration. An accelerometer may provide acceleration data as an analog signal and/or a digital number. A digital number may include a signed digital number. Digital numbers may be represented by any number of bits (e.g., 8-bit, 16-bit, 32-bit, etc.). An accelerometer may provide data in accordance with detecting acceleration. An accelerometer may provide data in accordance with acceleration detected along one or more axes (e.g., x-axis, y-axis, z-axis).

Data provided by an accelerometer may be used to detect translational movement of an object, such as a CEW. Data provided by an accelerometer may be used to detect whether an object has moved or not moved (e.g., remained stationary).

An analysis circuit receives acceleration information from an accelerometer, analyzes the information to detect movement or no movement, and provides a result of the analysis. An analysis circuit may detect movement or no movement over a period of time.

An analysis circuit may perform any type of analysis to determine whether the information provided by the accelerometer indicates motion or the lack of motion. The analysis may include an analysis (e.g., computations, comparisons, filtering, etc.) of signals and/or data from the accelerometer. The analysis may be performed in real-time. The analysis may be performed over a period of time.

An analysis circuit may include one or more filters that filter data (e.g., analog, digital). Filters may include low-pass filters and/or high-pass filters. A filter may be implemented in any manner and use any technology. A filter may be implemented with passive components and/or active components. A filter may be implemented as a finite impulse response (FIR) filter, an infinite impulse response (IIR) filter, and/or any other suitable filter. A filter may be implemented to include any number of orders (e.g., first order, second order, etc.). A low-pass filter may be used to identify data for detecting small accelerations of an object. A high-pass filter may be used to identify data for detecting large accelerations of an object.

An analysis circuit may include a circuit that monitors information from an accelerometer to determine an average value of the information (e.g., signal, digital). An analysis circuit may include a circuit that takes a difference between two or more signals or data. An analysis circuit may include a circuit for detecting a minimum value and/or a maximum value of a signal or data. An analysis circuit may include a circuit for comparing a signal and/or data to a threshold. An analysis circuit may include a divider to divide a number represented as analog and/or digital data.

In an implementation, and with reference again to FIG. 3, accelerometer 310 is a three-axis accelerometer that detects dynamic and static acceleration along the x-axis, y-axis, and z-axis. Accelerometer 310 reports acceleration along each axis as a digital signed number. Analysis circuit 320 includes one or more filters that filter the data provided for each axis. Analysis circuit 320 may store the data from the filters over several cycles of a clock. Analysis circuit 320 may use comparators to detect when the movement of accelerometer 310 is less than a threshold. Movement less than a threshold indicates that accelerometer 310, and thus the object, has not moved.

Analysis circuit 320 may monitor the comparators for one or more periods of time. If the comparators report no movement for a period of time, analysis circuit 320 may report (e.g., provide a signal, provide data, etc.) via result 322 indicating that the object to which accelerometer 310 is attached has not moved for a period of time. Analysis circuit 320 may monitor the comparators for two or more periods of time and report a result of monitoring via result 322 for each period monitored. A processing circuit (such as processing circuit 220, with brief reference to FIG. 2) may perform some or all of the functions of analysis circuit 320.

Processing circuit 220 may receive the result reported by analysis circuit 320. Processing circuit 220 may perform an operation responsive to the result.

Figure 7:
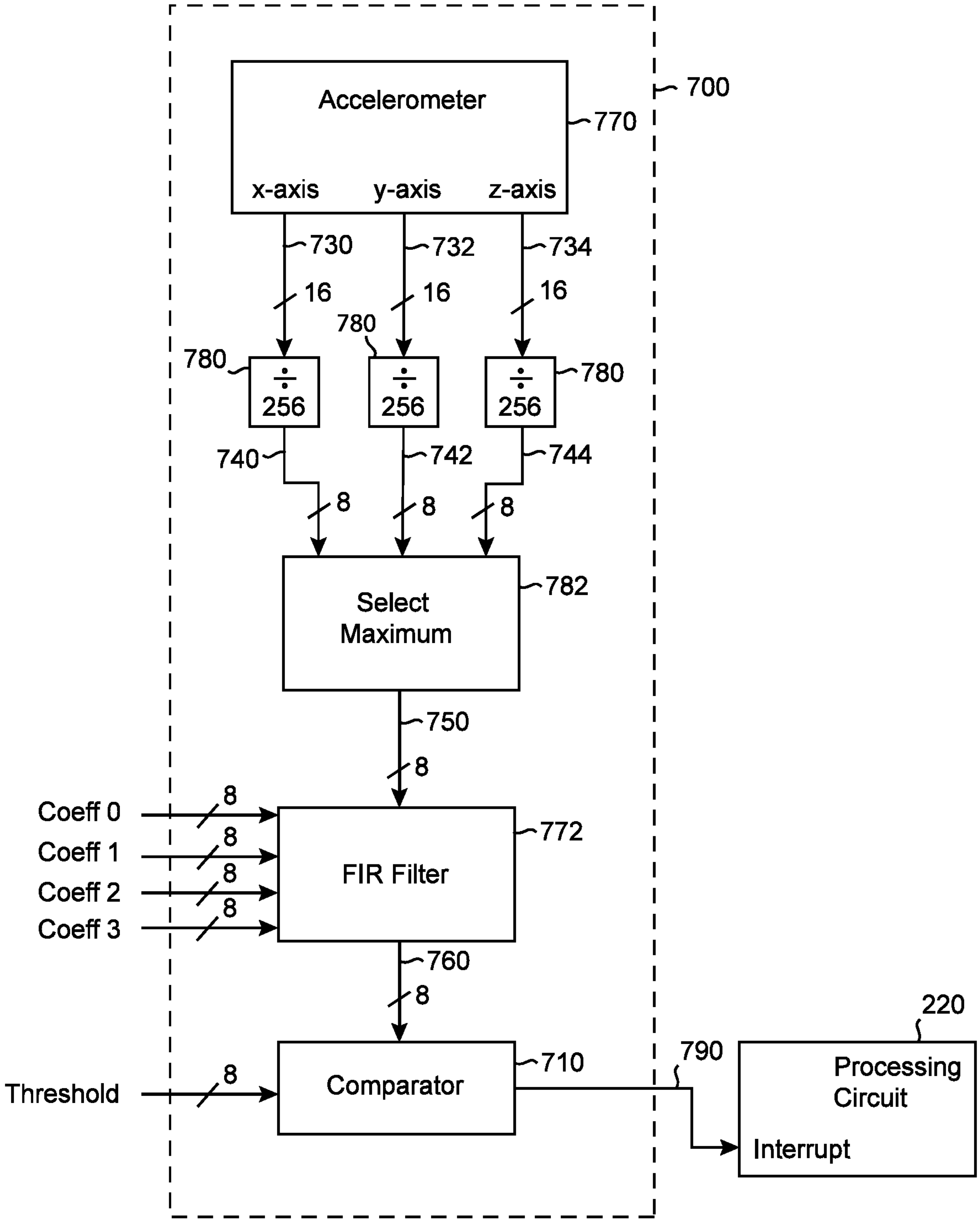
FIG. 7 is a block diagram of a motion detector, in accordance with various embodiments.

In various embodiments, and with reference to FIG. 7, a motion detector 700 is disclosed. Motion detector 700 may be an implementation of a motion detector discussed herein. Motion detector 700 may perform the functions of a motion detector as discussed above. Motion detector 700 may cooperate with processing circuit 220 to perform operations response to a detected motion, as discussed further herein.

Motion detector 700 may include an accelerometer 770, one or more dividers 780, a select 782, a finite impulse response ("FIR") filter 772, and/or a comparator 710. In various embodiments, motion detector 700 may also comprise a gyroscope and/or any other component configured to detect motion, as discussed further above.

Figure 8:
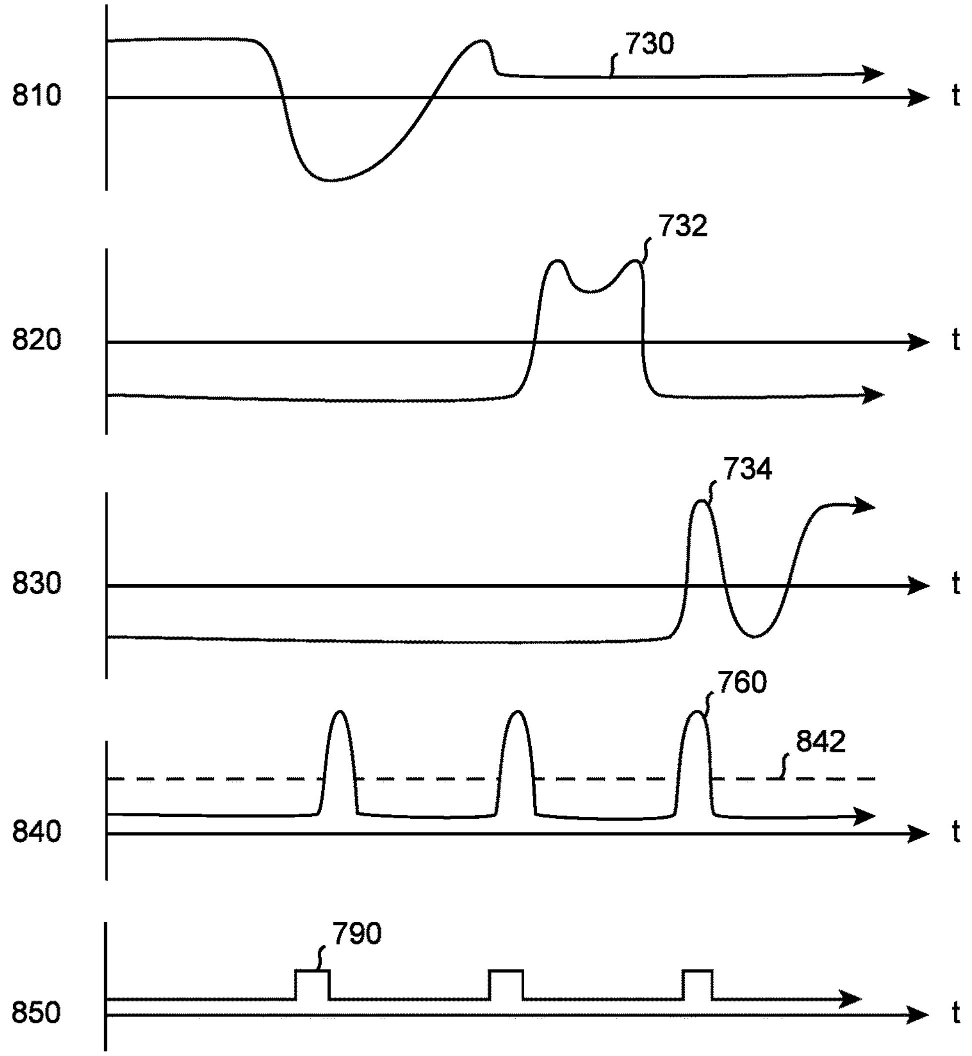
FIG. 8 is an illustration of various signals produced by a motion detector, in accordance with various embodiments.

Accelerometer 770 of motion detector 700 provides output data 730, 732, and 734. Output data 730, 732 and 734, shown on graphs 810, 820 and 830, with reference to FIG. 8, are respectively 16-bit signed numbers that represent acceleration along the x-axis, y-axis, and z-axis. The 16-bit numbers of output data 730, 732, and 734 represent the detected force of dynamic acceleration (e.g., acceleration "a") of an object and the force of static acceleration due to gravity (e.g., G).

When the object is at rest, the values of output data 730, 732, and 734 represent the force applied by gravity alone. Accelerometer 770 may be attached to an object that is at rest on a horizontal surface. The sensors that provide output data 730, 732, and 734 may be oriented along the x-axis, y-axis, and z-axis, respectively. Assume that the force of gravity acts only along the z-axis. The value of the 16-bit numbers for output data 730 and 732 represent the number that is provided when there is no force from dynamic acceleration and no force from gravity. Since the 16-bit numbers are signed, they could be zero or any positive or negative value. However, the output value would preferably be in about the middle of the range of the 16-bit number (e.g., about zero).

The value of the 16-bit number for output data 734 is the number that is provided by the accelerometer when there is no force from dynamic acceleration, but when there is a force of one-G from gravity. The value of the number may be any value, but it will be different from the values provided by output data 730 and 732 because it detects and reports the acceleration due to gravity. Depending on the range of the values of the 16-bit number, the value of output data 744 will be about a 1-G amount away from the values of output data 730 and 732. For example, if accelerometer 770 can measure forces of acceleration that are +/−10 times the value of G, then the value of output data 734 while the object is at rest will be the number that represents +/−1 G.

If the object were to move only along the z-axis, the changes to the output data 734 would change as discussed above with respect to detector 400. The value of the output data 734 would be the dynamic acceleration of the object and the acceleration due to the force of gravity. If the object were to move along the x-axis or the y-axis exclusively, the values of the 16-bit numbers for output data 730 and 732 would represent the values for dynamic acceleration only with no contribution from gravity.

In motion detector 700, value of output data 730, 732, and 734 may be divided by 256 (e.g., decimated, lower 8-bits truncated). Cutting off the lower 8-bits of the 16-bit numbers decreases the sensitivity (e.g., range) of the numbers reported by accelerometer 770. The lower bits of the 16-bit number represent accelerations of lower value, or lesser accelerations, than the accelerations represented by the upper bits of the 16-bit numbers. Cutting off the lower bits of the 16-bit number means that the accelerations represented by the numbers 740-744 are for more rapid accelerations or higher accelerations than the accelerations represented by the lower 8-bits. Dividing output data 730, 732, and 734 by 256 means that accelerations of lesser amounts are ignored. Numbers 740-744 are 8-bit signed numbers.

Ignoring or eliminating accelerations of a smaller value provides greater confidence that when accelerometer 770 reports an acceleration it is an acceleration that represents purposeful movement of the object and not merely fluctuations of a sensitive accelerometer.

The values of number 740, 742, and 744 may be analyzed in any manner to determine if there has been movement of the object. The values of number 740, 742, and 744 may be summed, averaged, or subtracted in an effort to determine whether the object has moved or is stationary. In one implementation of motion detector 700, number 740, 742, and 744 are provided to select 782 to determine which number is greatest. In one implementation, select 782 is implemented as a circuit. In one implementation, select 782 may be implemented using a processing circuit configured to execute a stored program.

Selecting the greatest number from number 740, 742, and 744 means that only the greatest acceleration along a single axis is considered during any period of time. In an implementation, the maximum number from numbers 740-744 is selected for each cycle of a clock. The clock may be the same clock that drives FIR filter 772. The number selected by select 782 is provided as output 750. Output 750 may be a signed, 8-bit number. Output 750 may be provided to FIR filter 772.

Figure 9:
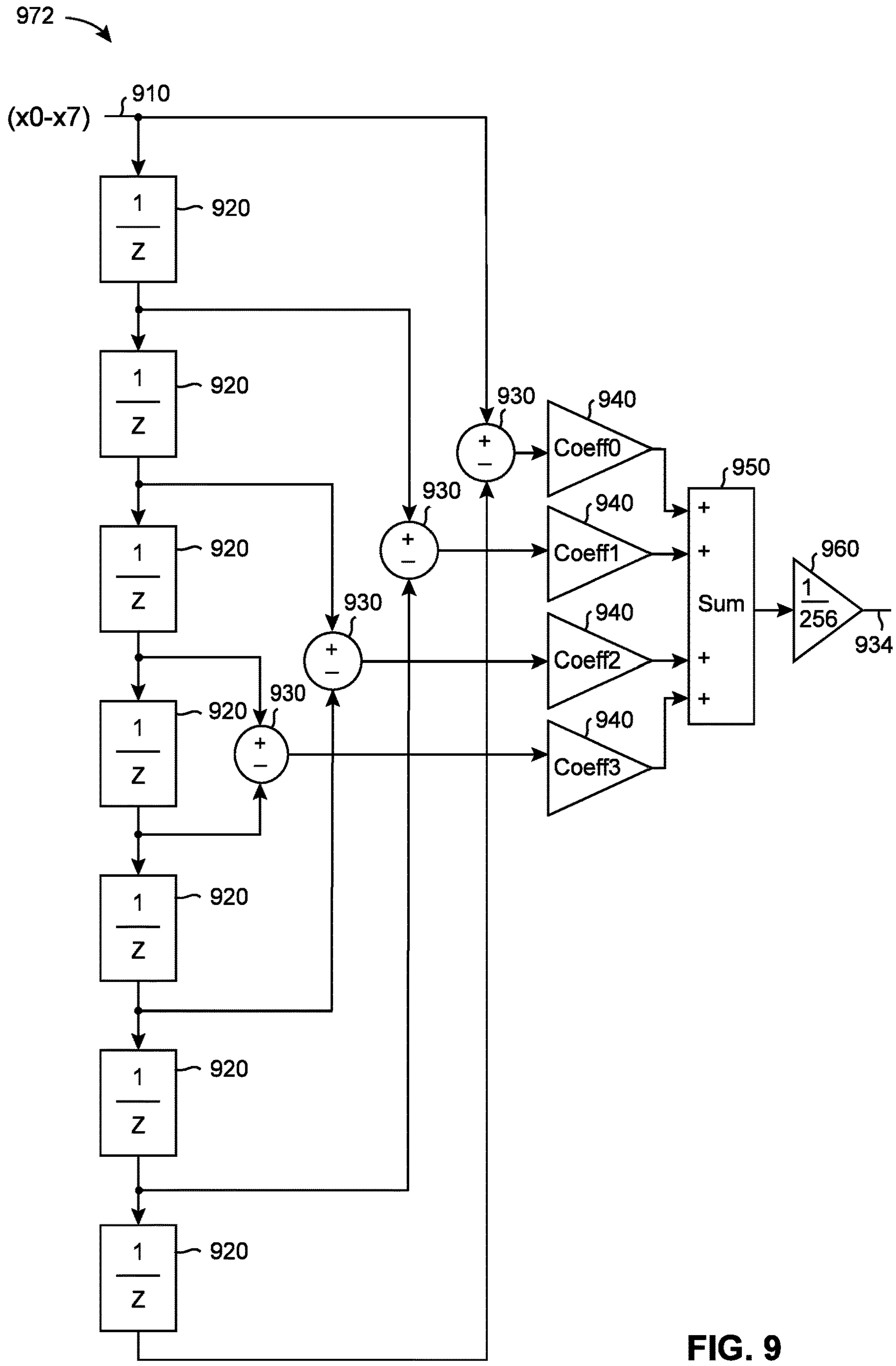
FIG. 9 is a block diagram of a finite impulse response (FIR) filter for a motion detector, in accordance with various embodiments.

In an implementation, FIR filter 772 is implemented as a 7th order antisymmetric linear phase filter. An implementation of FIR filter 772 is depicted in FIG. 9. The output of FIR filter 772, output 760/934, is an 8-bit number. The absolute value of output 760, shown on graph 840, with brief reference to FIG. 8, shows rapid changes (e.g., spikes) in the value of the 8-bit number that represent movement of the CEW in any one or any combination of the axes. Each instance the value of output 760 changes rapidly, the CEW has moved.

Input 910 to FIR filter 972 is the 8-bit number from select 782. Delays 920 shifts the values of input 910 so that the value of the 8-bit number propagates through the circuit with each clock cycle of the filter. Delay 920 may delay a value for one or more cycles. In this implementation, the delay 920 is one clock cycle. Input 910 and the delayed version are combined (e.g., added, subtracted) as a signed number by summers 930. The combined numbers are multiplied by coefficient0 through coefficient3 by multipliers 940. Each coefficient is an 8-bit number. A coefficient may be stored in a register and provided to the FIR filter. The output of multipliers 940 is summed by summer 950. The output of summer 950 is divided by 256 and provided as output 934 (e.g., 760) of the FIR filter.

The function implemented by FIR filter 972 is expressed by Equation 1 below. The decimation performed by FIR filter 972 is not expressly show in Equation 1.

$$\text{Output } 934=(X0-X7)*\text{Coefficient0}+(X1-X6)*\text{Coefficient1}+(X2-X5)*\text{Coefficient2}+(X3-X4)*\text{Coefficient3} \quad \text{Equation 1}$$

Output 760 of the FIR filter 772 is provided to comparator 710. Comparator 710 receives an 8-bit threshold. The threshold received by comparator 710 is shown as threshold 842 on graph 840 of FIG. 8. Each instance the value of the FIR filter output 760 is greater than the threshold, comparator 710 generates a pulse (e.g., high voltage) for one cycle. Each pulse provided by comparator 710 on its output 790 represents detected movement of the CEW. If comparator 710 does not provide a pulse on output 790 for a period of time, the CEW has not moved for that period of time.

Processing circuit 220 may receive the signal provided on output 790 of comparator 710. Processing circuit 220 may implement a count-down timer. Each time output 790 provides a pulse, the count-down timer is reset (e.g., starts count-down anew). If the count-down timer counts down to zero, processing circuit 220 knows that CEW 200 has been inactive (e.g., without motion) or active (e.g., with motion) for the period of time it took to count down to zero.

Processing circuit 220 may implement additional timers to track the expiration of two or more periods of time. Each time a period expires without receiving a pulse from output 790 of comparator 710, processing circuit 220 knows that CEW has moved or not moved (as applicable) for that period of time.

In one implementation, motion detector 700 is implemented using an accelerometer produced by ST Microelectronics, headquartered in Geneva, Switzerland. For example, motion detector 700 may comprise an ST Microelectronics LIS3DSH. The LIS3DSH includes logic for implementing dividers 780, select 782, FIR filter 772, and comparator 710. In one implementation, the output of FIR filter 772 is provided to processing circuit 220 which implements comparator 710. In another implementation, processing circuit receives the output signals (e.g., 312, 730, 732, 734) from an accelerometer (e.g., 300, 700) and determines whether the CEW has moved.

In various embodiments, a CEW may be configured to perform an operation in response to detecting a motion (or receiving a signal indicative of a motion). The operation may be related to a deployment capability of the CEW (e.g., a deployment operation). The operation may be related to the deployment of electrodes from the CEW. For example, the operation may comprise a CEW operation. A CEW operation may comprise selecting an operating mode, enabling or disabling a safety, enabling or disabling one or more accessories, ejecting a cartridge, and/or the like. As a further example, the operation may comprise a cartridge operation. The cartridge operation may comprise selecting a cartridge as an active cartridge (e.g., the cartridge to deploy electrodes responsive to a trigger activation), selecting a bay of a CEW as an active bay (e.g., the cartridge located in the active bay is selected to deploy electrodes responsive to a trigger activation), and/or the like. As a further example, the operation may comprise an electrode operation. The electrode operation may comprise selecting a set of electrodes, selecting an electrode type, selecting a number of electrodes, and/or the like.

In that regard, the operation (e.g., the deployment operation) may be different than a power saving operation including merely providing or restricting power or energy to one or more components of a CEW.

In various embodiments, the operation may comprise one or more of an electrical operation, a mechanical operation, or an electronic operation. For example, an electrical operation may comprise opening or closing an electrical switch; enabling, disabling, or selecting an electrical circuit; and/or the like. For example, a mechanical operation may comprise activating a switch (e.g., a servo switch) to mechanically operate a mechanical component of a CEW, controlling an actuator, or the like. For example, an electronic operation may comprise executing an instruction, transmitting an instruction to an electronic component of a CEW, or the like.

In various embodiments, an operation may comprise switching (or selecting) an operating mode of a CEW. For example, an operation may comprise switching (or selecting) between a normal mode, a critical use mode, a stealth mode (e.g., one or more accessories disabled), a flashlight mode, a debug mode, a maintenance mode, a training mode, and/or the like. As a further example, an operation may comprise switching (or selecting) between an active mode or a safety mode. In some embodiments, an operation to enable or disable a safety may include mechanically operating a safety switch between a safety position and an active position.

In various embodiments, an operation may comprise ejecting a cartridge from a bay of a CEW. In some embodiments, an operation to eject a cartridge may include controlling a switch, actuator, or other ejection means to eject the cartridge. The selected cartridge to be ejected may be based on a previously active or selected cartridge. The selected cartridge to be ejected may be based on detecting or selecting a cartridge with all its electrodes deployed. The selected cartridge to be ejected may be based on an operation (e.g., a first operation to select a cartridge before a second operation to eject the selected cartridge).

In various embodiments, an operation may comprise switching (or selecting) which bay of a CEW is active and which associated cartridge will be deployed in response to a trigger activation (e.g., selecting a first bay containing a first cartridge, selecting a second bay containing a second cartridge, etc.).

In various embodiments, an operation may comprise switching (or selecting) which cartridge is active and which electrodes will be deployed from a CEW in response to a trigger activation. The cartridge may be a different cartridge relative to a second cartridge selected prior. The cartridge may be associated with a different range of deployment. For example, a close-quarters or short-range cartridge may be selected in an operation In another example, a stand-off or long-range cartridge may be selected in an operation.

In various embodiments, an operation may comprise automatically selecting a cartridge in accordance with a range associated with the cartridge. Particularly, the cartridge with a different range relative to a second range of a second cartridge prior to the operation may be automatically selected. For example, a short-range cartridge may be automatically selected after a long-range cartridge. Alternately or additionally, a long-range cartridge may be automatically selected after a short-range cartridge.

In various embodiments, an operation may comprise selecting a cartridge or bay based on the motion. For example, in a CEW having two bays (e.g., a left bay and a right bay) a detected motion to the right (or sequence of motions to the right) may select the right bay and a detected motion to the left may select the left bay (or sequence of motions to the left). As a further example, in a CEW having two bays with two loaded cartridges(e.g., a left cartridge and a right cartridge) a detected motion to the right (or sequence of motions to the right) may select the right cartridge and a detected motion to the left may select the left cartridge (or sequence of motions to the left).

In various embodiments, an operation may comprise selecting a set of electrodes to deploy in response to a trigger activation. The set of electrodes may all be from a same cartridge. The set of electrodes may include one or more electrodes from a different cartridge (e.g., one or more electrodes from a same cartridge and one or more electrodes from a different cartridge). The set of electrodes may comprise a common characteristic (e.g., configured for short-range deployment, configured for long-range deployment, etc.). In embodiments, a combination of electrodes may be selected, independent of one or more cartridges in which the electrodes may or may not be disposed in a CEW.

In various embodiments, an operation may comprise selecting a number of electrodes to deploy in response to a trigger activation (e.g., one electrode, two electrodes, three electrodes, etc.). In various embodiments, an operation may comprise increasing a number of electrodes to deploy in response to a trigger activation (e.g., increasing from one electrode to two electrodes). In various embodiments, an operation may comprise cycling through a fixed number of electrodes to deploy in response to a trigger activation (e.g., cycling through a selection of one electrode, two electrodes, three electrodes, and back to one electrode again).

In various embodiments, an operation may comprise selecting a type of electrode or a type of projectile to be deployed. The selected electrodes or projectiles based on type may include electrodes or projectiles from a same cartridge. The selected electrodes or projectiles based on type may include electrodes or projectiles from a different cartridge (e.g., one or more electrodes/projectiles from a same cartridge and one or more electrodes/projectiles from a different cartridge).

In various embodiments, an operation may comprise deploying one or more electrodes from a cartridge of the CEW.

In various embodiments, a motion may comprise a movement of the CEW including a tilt, a rotation, a reposition in one or more linear directions, and/or the like. For example, a motion may comprise a movement of a CEW along a rotational axis. A motion may be detected along one or more of an x-axis, a y-axis, and/or a z-axis.

A motion may comprise a movement of a CEW forward a user (e.g., a user holding the CEW), backward the user, to a left of the user, a right of the user, a diagonal direction of the user, and/or any combination of motions therein. A motion may comprise one or more movements of the CEW as a user unholsters and aims the CEW (e.g., a ready motion, an aiming motion, an escalation motion, etc.). A motion may comprise a movement of the CEW as a user holsters a CEW (e.g., a holstering motion, a de-escalation motion, etc.).

A motion may comprise a rotation or a tilt of a CEW. For example, and with reference again to FIG. 1, a motion may comprise a movement of CEW 100 including third side 164 toward first side 160 (e.g., a right rotation), third side 164 toward second side 162 (e.g., a left rotation), third side 164 toward fourth side 166 (e.g., a downward rotation, a first loading motion, a first cocking motion, etc.), fourth side 166 toward first side 160 (e.g., a left rotation), fourth side 166 toward second side 162 (e.g., a right rotation), fourth side 166 toward third side 164 (e.g., an upward rotation, a second loading motion, a second cocking motion, etc.), first side 160 toward second side 162 (e.g., a left tilt), second side 162 toward first side 160 (e.g., a right tilt), and/or any combination of motions therein. As a further example, a motion may comprise any directional movement of one or more of first side 160, second side 162, third side 164, and/or fourth side 166.

A motion may comprise a change of spatial position of a CEW. For example, a motion may include movement of a CEW from a first position to a second position. A motion may also include movement of a CEW from a first position to a second position and from the second position back to the first position, or any other sequence of positional movements.

In various embodiments, a motion may also comprise a motion measurement such as a distance (e.g., a distance of the movement), a degree (e.g., a degree of rotation or tilt), a time period (e.g., a time count the motion is occurring during), and/or the like.

In various embodiments, a CEW may be configured to detect a motion of the CEW. The CEW may be configured to detect or measure the motion use any suitable technique. For example, a motion detector (e.g., motion detector 270, with brief reference to FIG. 2) alone or in communication with a processing circuit (e.g., processing circuit 220, with brief reference to FIG. 2) may be configured to detect or measure the motion. The processing circuit of the CEW may perform one or more operations in response to detecting the motion, as discussed further herein.

In various embodiments, a CEW may be configured to receive a signal indicating a motion of the CEW. For example, the CEW may receive a signal, data, information, or the like from an external electronic device indicating a motion of the CEW. The signal, data, information, or the like may contain data about the motion, such as the motion that was detected, a motion measurement, or the like. For example, a communication circuit (e.g., communication circuit 230, with brief reference to FIG. 2) of a CEW may be in electronic communication with an electronic device such as a computing device (e.g., a smart phone, a laptop, etc.), a body-worn camera, a vehicle or platform mounted camera, and/or any other electronic device capable of detecting and capturing motion of the CEW. The electronic device may be configured to transmit the signal, data, information, or the like to the CEW in response to detecting and/or capturing the motion of the CEW. A processing circuit (e.g., processing circuit 220, with brief reference to FIG. 2) of the CEW may perform one or more operations in response to receiving the signal, data, information, or the like, as discussed further herein.

In various embodiments, a CEW may review (e.g., ingest, analyze, etc.) a motion of the CEW (e.g., the detected motion, the captured motion, etc.) to determine whether to perform an operation. For example, a CEW may compare a motion to a predetermined movement. The predetermined movement may be associated with one or more operations. In that regard, in response to a detected motion matching a predetermined movement, the CEW may perform the one or more operations associated with the predetermined movement. A processing circuit (e.g., processing circuit 220, with brief reference to FIG. 2) and/or a motion detector (e.g., motion detector 270, with brief reference to FIG. 2) of the CEW may be configured to compare the motion to the predetermined movement and perform one or more operations based on the comparing.

The predetermined movement may comprise a motion, a rotation, a tilt, a movement, and/or the like, similar to any other motion or movement described herein. The predetermined movement may comprise a movement (or data indicative of a movement), a period of time, a threshold (e.g., an amount of movement to match the predetermined movement), and/or a movement measurement. The predetermined movement may comprise a sequence of movements. For example, a predetermined movement may comprise a first movement and a second movement. The first movement may be different from the second movement. The first movement may be the same as the second movement. The second movement may be an opposite movement from the first movement. The first movement may comprise moving a CEW from a starting position to a second position, and the second movement may comprise moving the CEW from the second position back to the starting position. The first movement may be less than, equal to, or greater than the second movement. One or more movements in the sequence of movements may comprise a period of time and/or a movement measurement. The entire sequence of movements may also comprise a period of time. For example, the first movement and the second movement must be completed within a single period of time. As a further example, a first movement must be completed within a first period of time, a second movement must be detected (e.g., started) within a second period of time, and/or the second movement must be completed within a third period of time.

In various embodiments, the period of time may comprise a range of time (e.g., 1-5 seconds, etc.), a time threshold (e.g., less than 3 seconds, greater than 2 seconds, etc.), and/or any other time measurement.

The predetermined movement may be stored in a memory of the CEW. For example, a processing circuit (e.g., processing circuit 220, with brief reference to FIG. 2) and/or a motion detector (e.g., motion detector 270, with brief reference to FIG. 2) may access an internal memory (e.g., a processing circuit memory) or a memory of the CEW to retrieve the predetermined movement and/or to compare the (detected) motion with the predetermined movement.

In various embodiments, one or more available predetermined movements may be based on capabilities present in the CEW, one or more cartridges, and/or one or more electrodes. For example, available predetermined movements may be based on cartridge attributes of the one or more cartridges. In that regard, an operation associated with a predetermined movement may be available or unavailable based on the cartridge attributes. An operation may be determined based on a cartridge attribute and/or a detected motion (e.g., based on a predetermined movement).

In various embodiments, predetermined movements may be enabled (e.g., binary 1) or disabled (e.g., binary 0) based on a user input. The user input may be received directly into the CEW or may be received from an electronic device (e.g., computing device, desktop, laptop, etc.). In that respect, a law enforcement agency, law enforcement officer, or the like may select and enable certain predetermined movements while also selecting and disabling one or more other predetermined movements. In various embodiments, a user input may also control predetermined movements to be enabled or disabled based on one or more cartridge attributes.

For example, in an implementation and with reference to FIG. 2, motion detector 270 reports motion data to processing circuit 220. Processing circuit 220 performs calculations on the motion data provided by motion detector 270 to determine whether CEW 200 is moving. For example, motion detector 270 reports motion along an x-axis, a y-axis, and/or a z-axis. Processing circuit 220 determines whether the motion reported along the axes corresponds to a predetermined movement of CEW 200. Processing circuit 220 may use the data from motion detector 270 to detect movement in any direction (e.g., along or about any axis, including one or more rotational directions).

In response to the calculations performed by processing circuit 220, processing circuit 220 performs one or more operations associated with the predetermined movement. In one implementation, processing circuit 220 may further measure the passage of time to detect the predetermined movement within a period of time. Processing circuit 220 may perform one or more operation in response to detecting the predetermined movement during a period of time.

As a further example, in one implementation, motion detector 270 detects motion and performs calculations on the motion data to determine whether CEW 200 has moved in the predetermined movement. Motion detector 270 may detect movement in any direction. Motion detector 270 may measure a passage of time. Motion detector 270 may detect motion or the lack of motion of CEW 200 during one or more periods of time. Motion detector 270 may report motion or the lack of motion during one or more periods of time to processing circuit 220. Processing circuit 220 may respond to information provided by motion detector 270 to determine whether the information matches a predetermined movement. In response to the information matching a predetermined movement, processing circuit 220 may perform one or more operations associated with the predetermined movement.

For example, motion detector 270 detects movement of CEW 200 along a rotational axis. Motion detector 270 and/or processing circuit 220 measures the lapse of a period of time. In response to motion detector 270 detecting motion during the period of time, processing circuit 220 compares the motion to a predetermined movement, and in response to the motion matching a predetermined movement, performs one or more associated operations. In response to motion detector 270 not detecting the predetermined movement of CEW 200 during the period of time, or in response to processing circuit 220 being unable to match the motion with a predetermined movement, processing circuit 220 may not perform one or more operations.

In various embodiments, a CEW may provide an operation notification. The operation notification may be provided in response to a CEW (or a processing circuit of the CEW) performing an operation. The operation notification may be provided together with a CEW (or a processing circuit of the CEW) performing an operation. The operation notification may be associated with the operation performed by the CEW.

In various embodiments, the CEW may provide the operation notification to a user interface of the CEW, such as a visual interface, an audio interface, or the like. For example, the operation notification may comprise a visual output and/or an audio output. The visual output and/or the audio output may indicate the operation that was performed.

For example, the audio output may comprise a sound, prerecorded speech, or the like indicating the operation was performed, or will be performed (e.g., "close-quarters cartridge selected"). The visual output may comprise a visual display that the operation was performed, or will be performed. For example, a user interface of the CEW may display or otherwise provide which bay and/or which associated cartridge is selected for deployment. For example, the user interface may display two or more cartridges, and may highlight, underline, etc. the selected cartridge. The CEW may provide the operation notification by changing the displayed bay or cartridge that is highlighted, underlined, etc. As a further example, the user interface may display the selected cartridge and available electrodes, and may highlight, underline, etc. the electrodes selected for deployment. The CEW may provide the operation notification by changing one or more electrodes that are highlighted, underlined, etc.

In various embodiments, the operation notification may also comprise a haptic feedback. For example, the haptic feedback may comprise a rumble, a vibration, or the like notifying a user of the CEW that the operation was performed, or will be performed. In that respect, the haptic feedback may be provided through a handle of the CEW. In some embodiments, a CEW handle may comprise a haptic feedback device configured to provide the haptic feedback, such as, for example, an eccentric rotating mass (ERM) actuator, a linear resonant actuator (LRA), a piezoelectric actuator, and/or the like.

In various embodiments, the CEW may transmit the operation notification to an electronic device in electronic communication with the CEW. For example, the CEW may transmit the operation notification a body-worn camera. In some embodiments, the body-worn camera may activate and may begin recording video and/or audio in response to receiving the operation notification. In some embodiments, the body-worn camera may output a visual output and/or an audio output in response to receiving the operation notification.

In various embodiments, the operation notification may comprise a visual indication. The visual indication may control an output of one or more laser accessories. For example, controlling output of one or more laser accessories may include enabling a laser, disabling a laser, changing an orientation of a laser, and/or the like. In other embodiments, the visual indication may control an output of a flashlight. For example, the visual indication may enable or disable the flashlight, cause the flashlight to output more or less light, cause the flashlight to change the intensity of light output, cause the flashlight to output light based on an output pattern (e.g., strobing, flickering, flashing, etc.), and/or the like.

For example, and in accordance with various embodiments, a user may activate a CEW (e.g., disable a safety switch) and aim the CEW towards a target. At initial activation, the CEW may select a first bay (having a first cartridge), the first cartridge itself, or a first set of electrodes for deployment. The CEW (e.g., processing circuit) may instruct a laser accessory to provide a first visual indication of the expected flight of the electrodes from the first cartridge or the first set of electrodes. A user may move the CEW (e.g., in a predetermined motion). The CEW may detect the motion, and compare the motion to the predetermined motion. In response to motion matching the predetermined motion the CEW may perform an operation by selecting a second bay (having a second cartridge), the second cartridge itself, or a second set of electrodes. The CEW (e.g., processing circuit) may instruct the laser accessory to provide a second visual indication of the expected flight of the electrodes from the second cartridge or the second set of electrodes.

The second visual indication may be different from the first visual indication. For example, in response to the first cartridge being a short-range cartridge and the second cartridge being a long-range cartridge, the expected angle of deployment of electrodes from each cartridge may be different. In that respect, the first visual indication may comprise a wider visual display than the second visual indication. As a further example, as previously discussed an electrode may be disposed within the bore of a cartridge at an angle. In response to the first set of electrodes having at least one electrode disposed at an angle different than at least one electrode from the second set of electrodes, the visual indication may change in response to the operation.

Figure 10:
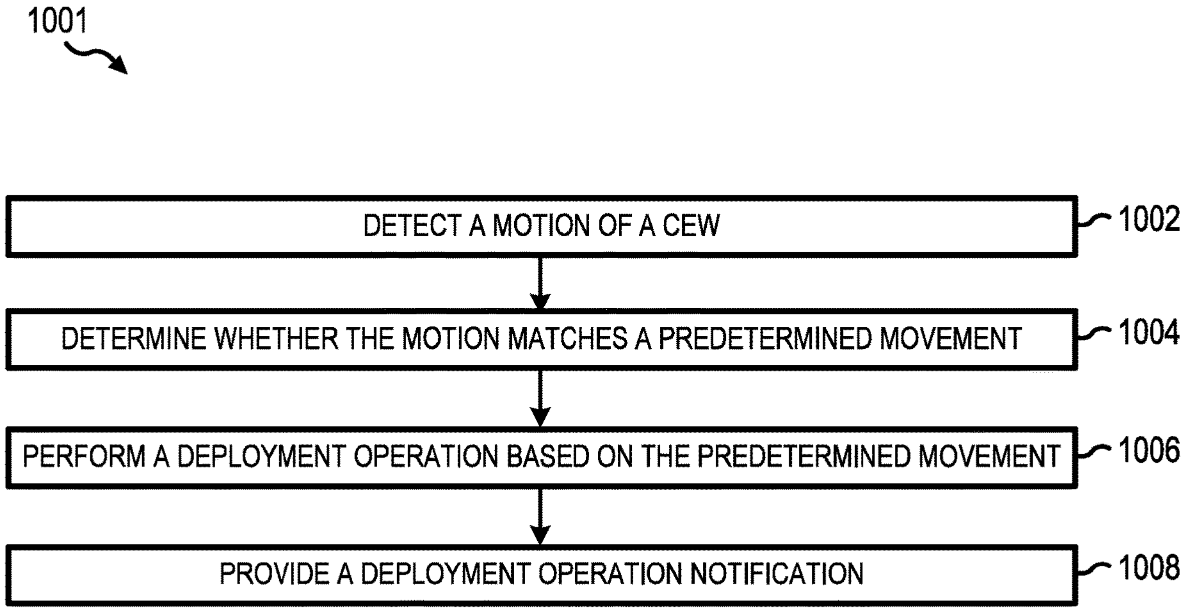
FIG. 10 is a process flow illustrating a method for motion-based operation of a CEW, in accordance with various embodiments.

In various embodiments, and with reference to FIG. 10, a method 1001 for motion-based operation of a CEW is disclosed. Method 1001 may be performed by a CEW or a component of a CEW. For example, method 1001 may be performed by a motion detector of a CEW. As a further example, method 1001 may be performed by a processing circuit of a CEW. As a further example, method 1001 may be performed by a motion detector and a processing circuit of a CEW. In that regard, the motion detector and the processing circuit may cooperate to perform one or more steps of method 1001. Cooperating to perform one or more steps of method 1001 may include the motion detector performing one or more steps independently, the processing circuit performing one or more steps independently, the motion detector and the processing circuit performing one or more steps together, and/or any combination of the above.

The CEW may detect a motion of the CEW (step 1002). As previously discussed herein, a motion may comprise a movement of the CEW including a tilt, a rotation, a reposition in one or more linear directions, and/or the like. For example, a motion may comprise a movement of a CEW along a rotational axis. A motion may be detected along one or more of an x-axis, a y-axis, and/or a z-axis. A motion may also comprise a motion measurement such as a measured distance, a measured degree of rotation or tilt, or the like. A motion may also include a time period of motion (e.g., a motion time period). The CEW may detect motion using any technique. In some embodiments, the CEW may capture the motion of the CEW to perform step 1002. The CEW may capture the motion in real-time, or near real-time, or at any other time interval. In some embodiments, an electronic device may capture the motion of the CEW and transmit information of the captured motion to the CEW. The CEW may receive and ingest the information of the captured motion to perform step 1002.

The CEW may determine whether the motion matches a predetermined movement (step 1004). The CEW may determine whether motion matches a predetermined movement using any technique. For example, a CEW may retrieve one or more predetermined movements from a memory of the CEW. The CEW may compare the motion to the predetermined movements to determine a match. As a further example, a CEW may query a memory of the CEW based on the motion to determine a match.

The CEW may perform a deployment operation based on the predetermined movement (step 1006). A CEW may determine a deployment operation based on the predetermined movement matching the motion. For example, each predetermined movement in the memory of the CEW may be associated with one or more operations. A predetermined movement may be associated with one or more operations using any suitable technique, including, for example, metadata, tags, database associations, or the like. In response to determining one or more operations associated with the predetermined movement, the CEW may perform the one or more operations. Performing the one or more operations may include performing an electrical operation, an electronic operation, a mechanical operation, and/or any combination therein, as previously discussed herein. In some embodiments, the operation stored in the memory may comprise instructions configured to be executed by a processing circuit of the CEW. In response to the processing circuit executing the instructions, the CEW may perform the operation.

The CEW may provide a deployment operation notification (step 1008). The CEW may be configured to provide the deployment operation notification in response to performing the operation. The CEW may be configured to provide the deployment operation notification during or with the operation. Providing the deployment operation notification may include transmitting the deployment operation notification to an electronic device and/or providing the deployment operation notification through the CEW. In some embodiments, instructions regarding the deployment operation notification may be stored in a memory of the CEW. The instructions may be associated with the predetermined movement and/or the operation. For example, providing the deployment operation notification may be a step or series of steps of the operation. The CEW may execute the instructions to perform the deployment operation notification.

The foregoing description discusses implementations (e.g., embodiments), which may be changed or modified without departing from the scope of the present disclosure as defined in the claims. Examples listed in parentheses may be used in the alternative or in any practical combination. As used in the specification and claims, the words "comprising," "comprises," "including," "includes," "having," and "has" introduce an open-ended statement of component structures and/or functions. In the specification and claims, the words "a" and "an" are used as indefinite articles meaning "one or more." While for the sake of clarity of description, several specific embodiments have been described, the scope of the invention is intended to be measured by the claims as set forth below. In the claims, the term "provided" is used to definitively identify an object that not a claimed element but an object that performs the function of a workpiece. For example, in the claim "an apparatus for aiming a provided barrel, the apparatus comprising: a housing, the barrel positioned in the housing," the "barrel" is not a claimed element of the apparatus, but an object that cooperates with the "housing" of the "apparatus" by being positioned in the "housing." Moreover, where a phrase similar to "at least one of A, B, or C" or "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The location indicators "herein," "hereunder," "above," "below," or other word that refer to a location, whether specific or general, in the specification shall be construed to refer to any location in the specification whether the location is before or after the location indicator.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods.

In general, functionality of computing devices described herein may be implemented in computing logic embodied in hardware or software instructions, which can be written in a programming language. Computing logic may be compiled into executable programs or written in interpreted programming languages. Generally, functionality described herein can be implemented as logic modules that can be duplicated to provide greater processing capability, merged with other modules, or divided into sub modules. The computing logic can be stored in any type of computer-readable medium (e.g., a non-transitory medium such as a memory or storage medium) or computer storage device and be stored on and executed by one or more general purpose or special purpose processors, thus creating a special purpose computing device configured to provide functionality described herein.

Many alternatives to the systems and devices described herein are possible. For example, individual modules or subsystems can be separated into additional modules or subsystems or combined into fewer modules or subsystems. As another example, modules or subsystems can be omitted or supplemented with other modules or subsystems. As another example, functions that are indicated as being performed by a particular device, processing circuit, module, or subsystem may instead be performed by one or more other devices, modules, processing circuits, or subsystems. Although some examples in the present disclosure include descriptions of devices comprising specific hardware components in specific arrangements, techniques and tools described herein can be modified to accommodate different hardware components, combinations, or arrangements. Further, although some examples in the present disclosure include descriptions of specific usage scenarios, techniques and tools described herein can be modified to accommodate different usage scenarios. Functionality that is described as being implemented in software can instead be implemented in hardware, or vice versa.

Many alternatives to the techniques described herein are possible. For example, processing stages in the various techniques can be separated into additional stages or combined into fewer stages. As another example, processing stages in the various techniques can be omitted or supplemented with other techniques or processing stages. As another example, processing stages that are described as occurring in a particular order can instead occur in a different order. As another example, processing stages that are described as being performed in a series of steps may instead be handled in a parallel fashion, with multiple modules or software processes concurrently handling one or more of the illustrated processing stages. As another example, processing stages that are indicated as being performed by a particular device or module may instead be performed by one or more other devices or modules.

Embodiments disclosed herein include a computer-implemented method for performing one or more of the above-described techniques; a computing device comprising a processor and computer-readable storage media having stored thereon computer executable instructions configured to cause the computing device to perform one or more of the above described techniques; and/or a computer-readable storage medium having stored thereon computer executable instructions configured to cause a computing device to perform one or more of the above-described techniques.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

What is claimed is:

1. A method comprising:

detecting, by a processing circuit, a motion of a conducted electrical weapon ("CEW");

retrieving, by the processing circuit, a predetermined movement;

comparing, by the processing circuit, the motion to the predetermined movement, wherein the predetermined movement defines a sequence of motions;

first determining, by the processing circuit, whether the predetermined movement matches the motion based on the comparing;

second determining, by the processing circuit, an operation based on the predetermined movement, wherein the operation is associated with the predetermined movement, and wherein the operation defines a deployment capability of the CEW, and wherein the operation comprises at least one of a cartridge operation and an electrode operation; and performing, by the processing circuit, the operation of the CEW.

2. The method of claim 1, further comprising providing, by the processing circuit, an operation notification based on the operation.

3. The method of claim 2, wherein the operation notification comprises at least one of a change in a visual indication of the CEW, a visual output, and an audio output.

4. The method of claim 1, wherein the motion comprises at least one of a motion measurement and a motion time period.

5. The method of claim 1, wherein the comparing the motion to the predetermined movement further comprises determining whether the motion occurred within a period of time.

6. The method of claim 1, wherein the operation further comprises a CEW operation.

7. The method of claim 6, wherein the CEW operation comprises at least one of selecting an operating mode of the CEW, enabling a safety of the CEW, disabling the safety of the CEW, and ejecting a cartridge of the CEW.

8. The method of claim 1, wherein the operation comprises the cartridge operation, and wherein the cartridge operation comprises selecting a cartridge of the CEW, selecting a cartridge bay of the CEW, selecting a short-range cartridge of the CEW, or selecting a long-range cartridge of the CEW.

9. The method of claim 1, wherein the operation comprises the electrode operation, and wherein the electrode operation comprises at least one of selecting a set of electrodes, selecting an electrode type, and selecting a number of electrodes.

10. The method of claim 1, wherein the operation comprises at least one of a mechanical operation, an electrical operation, and an electronic operation.

11. The method of claim 1, further comprising:

third determining, by the processing circuit, a cartridge attribute of the CEW, wherein the retrieving the predetermined movement further comprises determining an availability of the predetermined movement based on the cartridge attribute, and wherein the cartridge attribute defines at least one of a cartridge type, an electrode type, an electrode number, an electrode deployment number, and an electrode deployment angle.

12. A conducted electrical weapon ("CEW") comprising:

a motion detector operable to detect a motion of the CEW;

at least two sets of electrodes; and a processing circuit in communication with the motion detector, wherein the processing circuit is configured to:

retrieve a predetermined movement defining a series of movements, compare the motion to the predetermined movement, and in response to the motion corresponding to the predetermined movement, select a first set of electrodes of the at least two sets of electrodes based on operations associated with the predetermined movement.

13. The CEW of claim 12, wherein each set of electrodes of the at least two sets of electrodes is disposed in a different cartridge installed in the CEW.

14. The CEW of claim 12, wherein each set of electrodes of the at least two sets of electrodes is disposed in a same cartridge installed in the CEW.

15. The CEW of claim 12, further comprising:

a left cartridge inserted into a first bay of the CEW; and a right cartridge inserted into a second bay of the CEW, wherein the left cartridge and the right cartridge comprise the at least two sets of electrodes.

16. The CEW of claim 15, wherein the predetermined movement includes a rotational movement of the CEW, and wherein in response to the predetermined movement comprising a left rotational movement the processing circuit is configured to select the first set of electrodes from the left cartridge.

17. The CEW of claim 16, wherein in response to the predetermined movement comprising one of a second left rotational movement or a right rotational movement, the processing circuit is configured to select a second set of electrodes from the right cartridge.

18. The CEW of claim 12, wherein the processing circuit is configured to receive an input signal from the motion detector corresponding to the motion from the motion detector and process the input signal to detect the predetermined movement.

19. A method comprising:

receiving, by a processing circuit of a conducted electrical weapon ("CEW"), a signal corresponding to a detected motion of the CEW;

retrieving, by the processing circuit, a predetermined movement, wherein the predetermined movement defines a sequence of detected motions, and wherein the predetermined movement is associated with an operation of the CEW;

comparing, by the processing circuit, the signal to the predetermined movement;

determining, by the processing circuit, whether the predetermined movement matches the signal based on the comparing;

performing, by the processing circuit, the operation of the CEW based on the predetermined movement, wherein the operation is associated with a deployment capability of the CEW, and wherein the operation comprises at least one of a cartridge operation and an electrode operation; and providing, by the processing circuit, an operation notification based on the operation.

20. The method of claim 19, wherein the signal is received from a motion detector of the CEW or an electronic device in electronic communication with the CEW.

* * * * *